(12) United States Patent
Mangaroo et al.

(10) Patent No.: US 8,199,489 B2
(45) Date of Patent: Jun. 12, 2012

(54) HANDHELD TERMINAL WITH INDIVIDUALLY REPLACEABLE COMPONENTS

(75) Inventors: Alan Mangaroo, Oakville (CA); Bo Xu, Mississauga (CA); Barry Boyd, Oakville (CA)

(73) Assignee: Psion Teklogix Inc. (CA)

( * ) Notice: Subject to any disclaimer, the term of this patent is extended or adjusted under 35 U.S.C. 154(b) by 350 days.

(21) Appl. No.: 12/511,414

(22) Filed: Jul. 29, 2009

(65) Prior Publication Data

US 2010/0025286 A1 Feb. 4, 2010

(30) Foreign Application Priority Data

Jul. 29, 2008 (CA) ..................... 2638360
Jul. 28, 2009 (CA) ..................... 2673218

(51) Int. Cl.
*G06F 1/16* (2006.01)

(52) U.S. Cl. .............. 361/679.55; 361/731; 235/472.01; 235/472.02

(58) Field of Classification Search ............. 361/679.55, 361/731
See application file for complete search history.

(56) References Cited

U.S. PATENT DOCUMENTS

| | | | | |
|---|---|---|---|---|
| 5,146,615 A * | 9/1992 | Hodsdon et al. | ............. | 455/90.3 |
| 5,317,691 A * | 5/1994 | Traeger | ......................... | 709/250 |
| 5,679,943 A * | 10/1997 | Schultz et al. | ........... | 235/472.02 |
| 5,680,633 A * | 10/1997 | Koenck et al. | ........... | 235/472.02 |
| 6,031,524 A * | 2/2000 | Kunert | ........................ | 345/173 |
| 6,172,620 B1 * | 1/2001 | Brick et al. | ..................... | 341/22 |
| 7,612,997 B1 * | 11/2009 | Diebel et al. | ............. | 361/679.56 |
| 7,706,140 B2 * | 4/2010 | Grunow et al. | ......... | 361/679.56 |
| 7,748,632 B2 * | 7/2010 | Coleman et al. | ......... | 235/472.01 |
| 7,787,239 B2 * | 8/2010 | Mangaroo et al. | ....... | 361/679.01 |
| 2003/0006998 A1 * | 1/2003 | Kumar | ......................... | 345/700 |
| 2005/0150959 A1 * | 7/2005 | Izzo et al. | ................ | 235/472.02 |
| 2007/0108291 A1 * | 5/2007 | Bhatia et al. | ............. | 235/472.01 |
| 2007/0236462 A1 * | 10/2007 | Morris et al. | ................ | 345/169 |
| 2008/0123262 A1 * | 5/2008 | Coleman et al. | ............. | 361/680 |
| 2009/0091886 A1 * | 4/2009 | Grunow et al. | ......... | 361/679.56 |
| 2009/0168337 A1 * | 7/2009 | Conti et al. | ............... | 361/679.56 |

FOREIGN PATENT DOCUMENTS

CA 2638360 A1 1/2010

OTHER PUBLICATIONS

European Search Report for Application No. EP09009835 dated Mar. 9, 2010, 3 pages.
Canadian Intellectual Property Office, In regard of Application 2,673,218, May 6, 2010, 4 pages.

* cited by examiner

*Primary Examiner* — Anthony Q Edwards
(74) *Attorney, Agent, or Firm* — Stephen B. Salai, Esq.; Brian B. Shaw, Esq.; Harter Secrest & Emery LLP

(57) ABSTRACT

A handheld terminal is provided. The handheld terminal includes a housing, a component for operating the handheld terminal, and a pocket for forming, in the housing, a space for holding the component individually and separating the space from a main logic circuit. The pocket has a window for a connection between the component and the main logic circuit. The handheld terminal includes a bezel placed on the component, and a combiner for removable engaging the bezel with the housing.

14 Claims, 25 Drawing Sheets

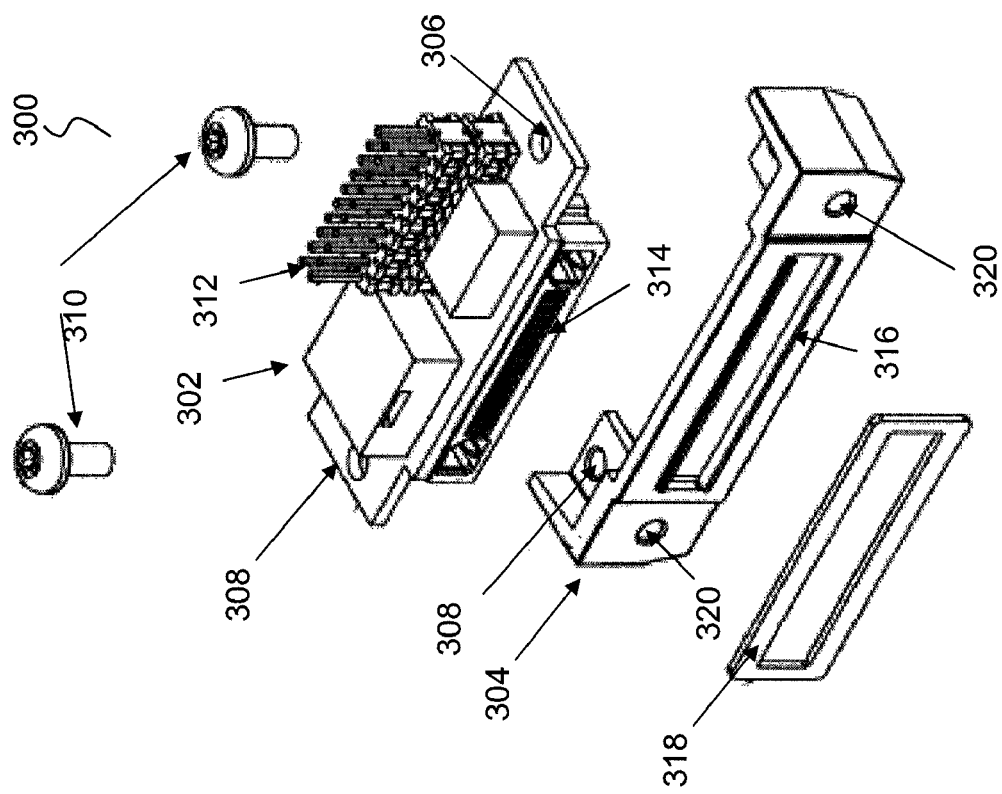
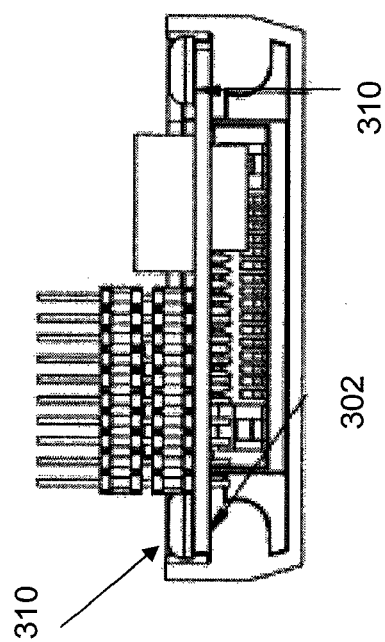
FIG. 8a
FIG. 8b

HANDHELD TERMINAL WITH INDIVIDUALLY REPLACEABLE COMPONENTS

CROSS-REFERENCE TO RELATED APPLICATIONS

This application claims priority to Canadian Patent Application Serial No. 2,638,360 filed Jul. 29, 2008 and to Canadian Patent Application Serial No. 2,673,218 filed Jul. 28, 2009.

STATEMENT REGARDING FEDERALLY SPONSORED RESEARCH OR DEVELOPMENT

None.

NAMES OF THE PARTIES TO A JOINT RESEARCH AGREEMENT

None.

REFERENCE TO A "SEQUENCE LISTING"

None.

BACKGROUND OF THE INVENTION

The use of handheld devices in harsh environments has increased. The handheld devices used in harsh environments may not only have to function in a wide range of operating temperatures, but also they may have to withstand harsh treatment such as repeated drops onto hard surfaces. The handheld devices may be used in a dusty or wet area, and as such the handheld should prevent against the ingress of dust and water.

Thus rugged handheld devices that can meet the requirements of the harsh environments require unique design considerations, in addition to the design considerations of non-rugged handheld devices.

For example, in order to ensure that water or dust does not enter the handheld device, the handheld device may need to meet or surpass Ingress Penetration (IP) tests. Typically this has required the sealing of the connection between housing components or parts using a gasket or similar seal.

However, the sealing may cause problems during assembly of the handheld device as the sealing must be seated correctly prior to securing housing components together. The sealing may make the resealing of housing components together in the field difficult.

The environment that rugged handheld devices are used in, in general results in parts needing to be replaced more often than non-rugged handheld devices. For example a touch screen may be broken by the repeated use of a screwdriver as a stylus. A display may be broken by dropping it. Docking connectors may break through repeated docking and undocking, and keyboards or keypad may wear out from use. Replacement of individual components in the field may be difficult using typical housing designs for rugged handheld devices and their sealing structures.

FIELD OF THE INVENTION

The present invention relates to handheld electronic devices, and more specifically to a handheld electronic device having individually replaceable components.

BRIEF SUMMARY OF THE INVENTION

It is an object of the invention to provide a handheld terminal that obviates or mitigates at least one of the disadvantages of existing systems.

According to an aspect of the present invention there is provided a handheld terminal, that includes: a housing; a component for operating the handheld terminal; a pocket for forming, in the housing, a space for holding the component individually and separating the space from a main logic circuit, the pocket having a window for a connection between the component and the main logic circuit; a bezel placed on the component; and a combiner for removable engaging the bezel with the housing.

According to another aspect of the present invention there is provided a handheld terminal, that includes: a housing; a display pocket for forming, in the housing, a display space for holding a display and separating the display space from a main logic circuit for operating the handheld terminal, the display pocket having a window for a connection between a display flex connector connected to the main logic circuit and a display flex for the display, the display flex connector being placed under the display pocket; a display bezel placed on the display; and a combiner for removable engaging the display bezel with the housing.

According to a further aspect of the present invention there is provided a handheld terminal, that includes: a housing; a keyboard pocket for forming, in the housing, a keyboard space for holding a keyboard assembly and separating the keyboard space from a main logic circuit for operating the handheld terminal, the keyboard assembly having a keyboard PCB, a keyboard elastomer placed on the keyboard PCB, the keyboard pocket having a window for a connection between a keyboard flex connected to the main logic circuit and the keyboard PCB, the keyboard connector being extended through the window; a keyboard bezel placed on the keyboard elastomer; and a combiner for removable engaging the keyboard bezel with the housing.

BRIEF DESCRIPTION OF THE SEVERAL VIEWS OF THE DRAWING

These and other features of the invention will become more apparent from the following description in which reference is made to the appended drawings wherein:

FIG. 8*a* is a an isometric view of an example of a docking connector applicable to the handheld terminal of FIG. 1;

FIG. 8*b* is a back view of the docking connector of FIG. 8*a;*

DETAILED DESCRIPTION OF THE INVENTION

Figure 1:
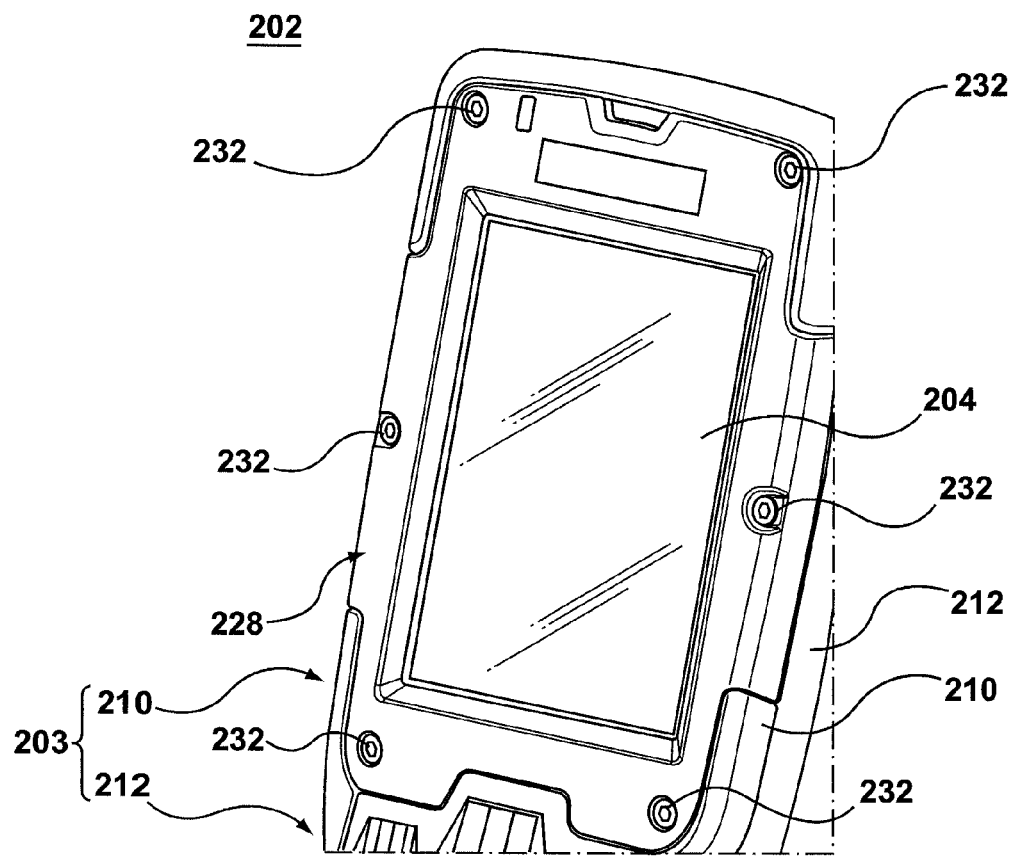
FIG. 1 shows a part of a display installation structure for a handheld terminal in accordance with an embodiment of the present invention.
Figure 2:
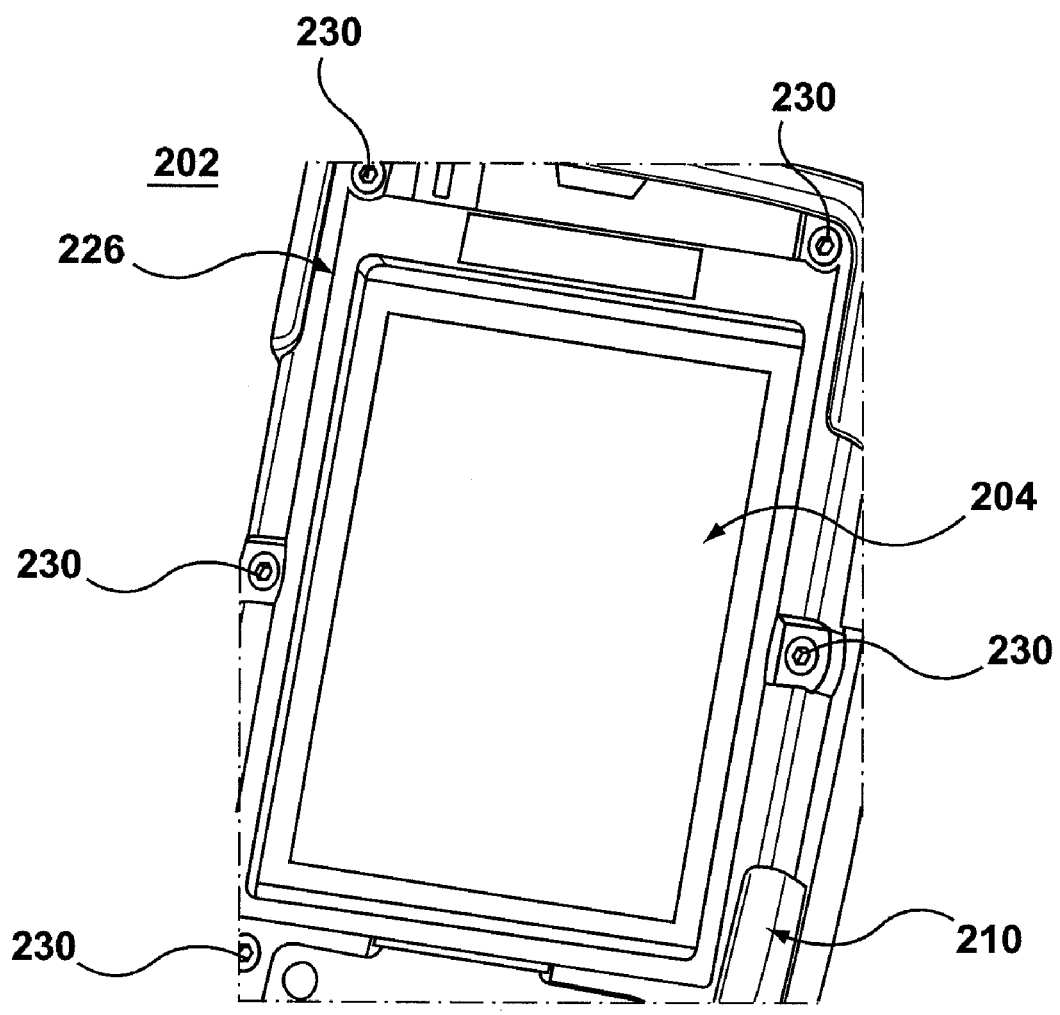
FIG. 2 shows a part of a display installation structure for the handheld terminal of FIG. 1, without a display bezel.
Figure 3:
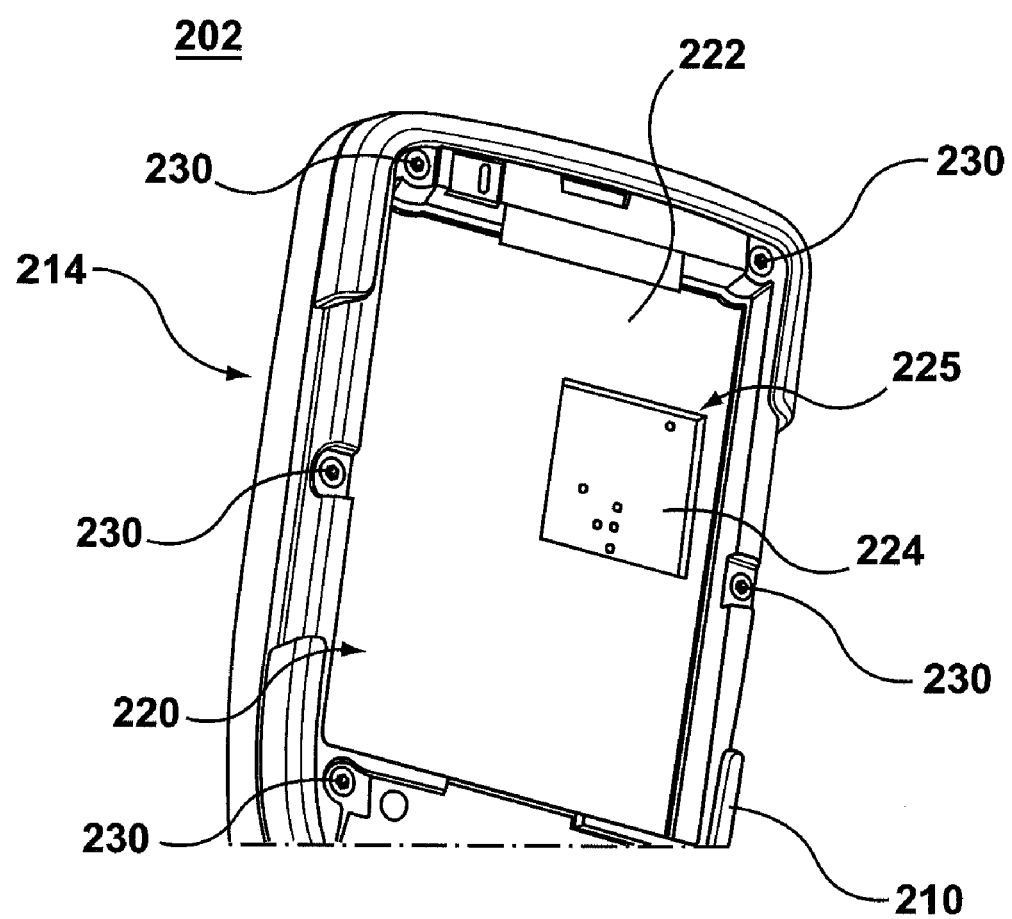
FIG. 3 shows a part of a display installation structure for the handheld terminal of FIG. 1, without a display.
Figure 4:
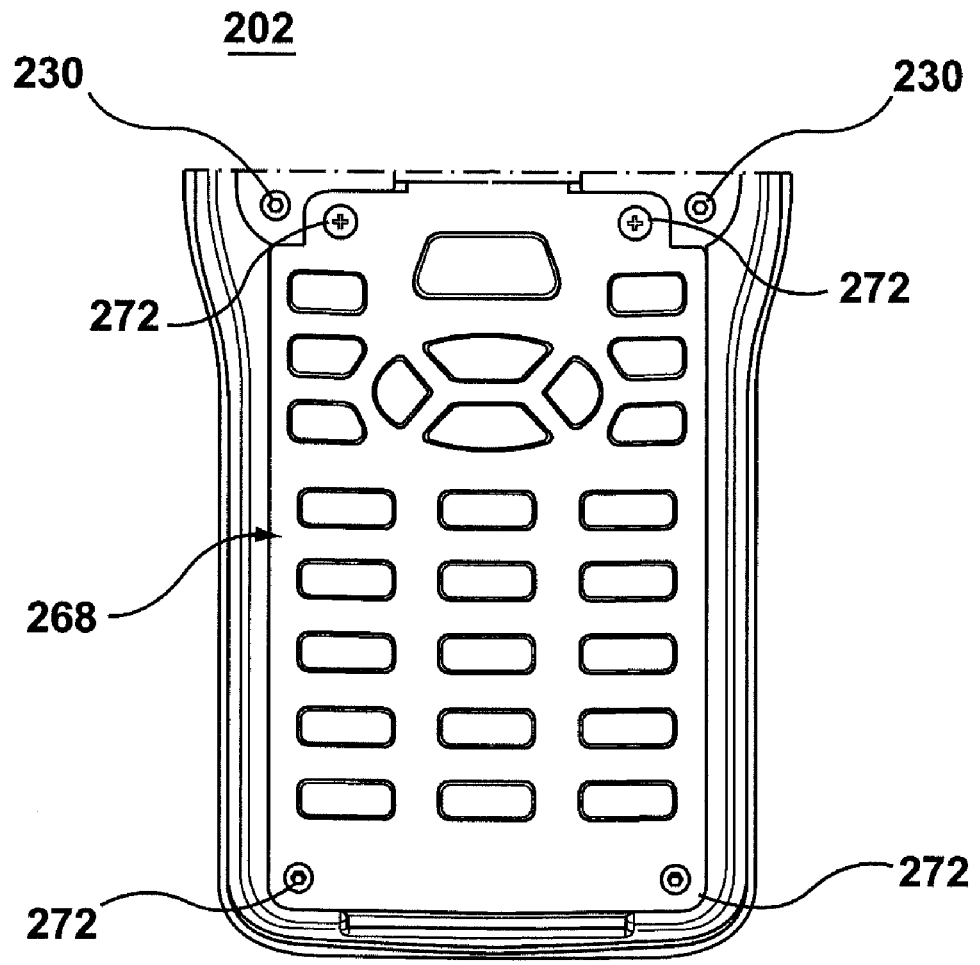
FIG. 4 shows a part of a keyboard assembly installation structure for a handheld terminal in accordance with an embodiment of the present invention.
Figure 5:
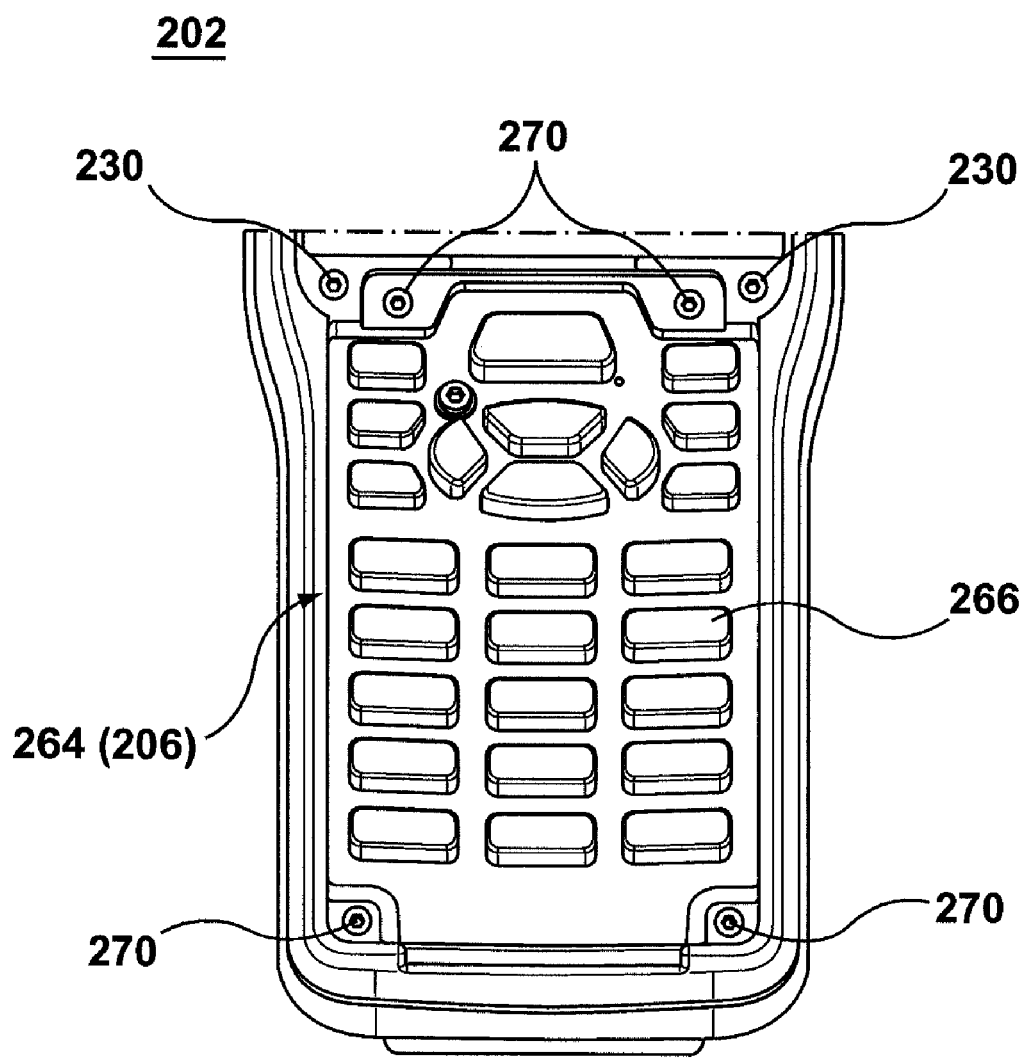
FIG. 5 shows a part of a keyboard assembly installation structure for the handheld terminal of FIG. 1, without a keypad bezel.
Figure 6:
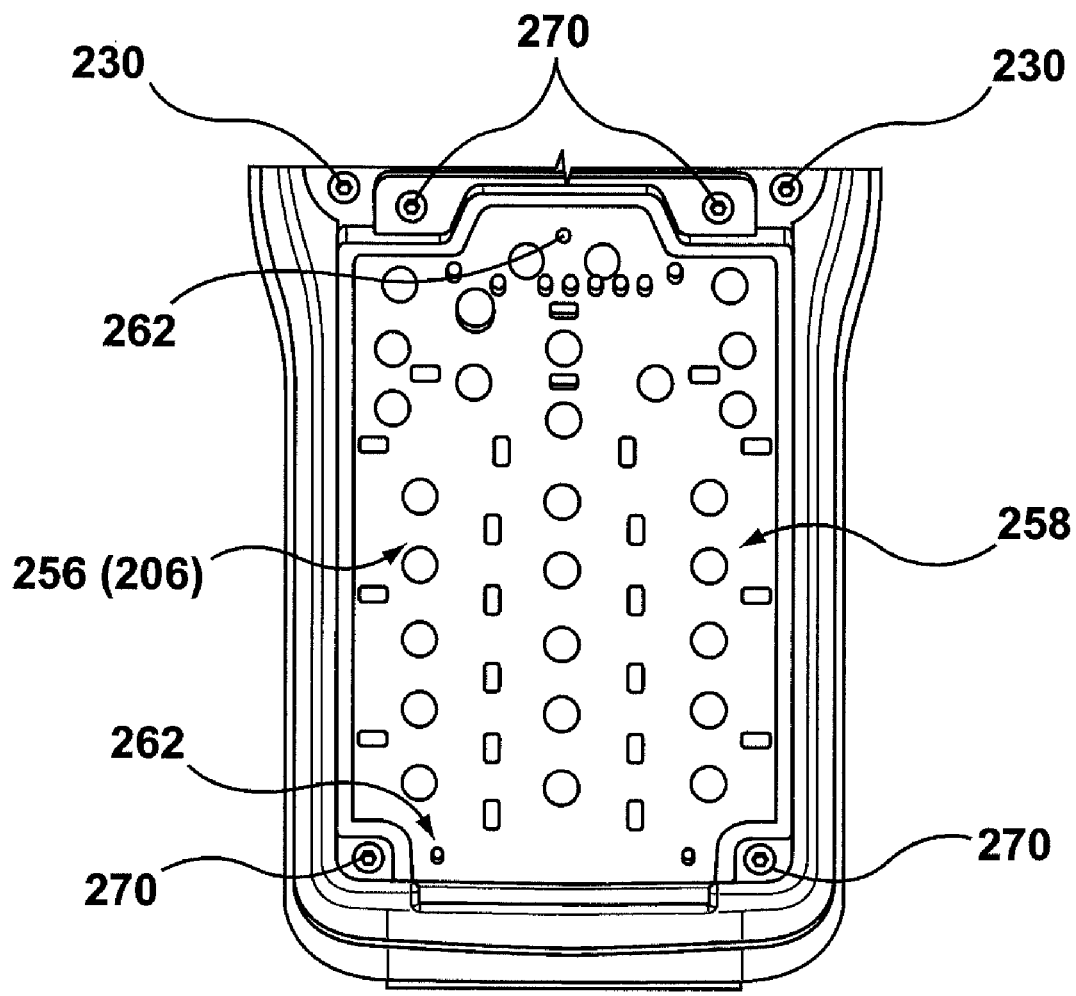
FIG. 6 shows a part of a keypad installation structure for the handheld terminal of FIG. 1, without a keypad elastomer.
Figure 7:
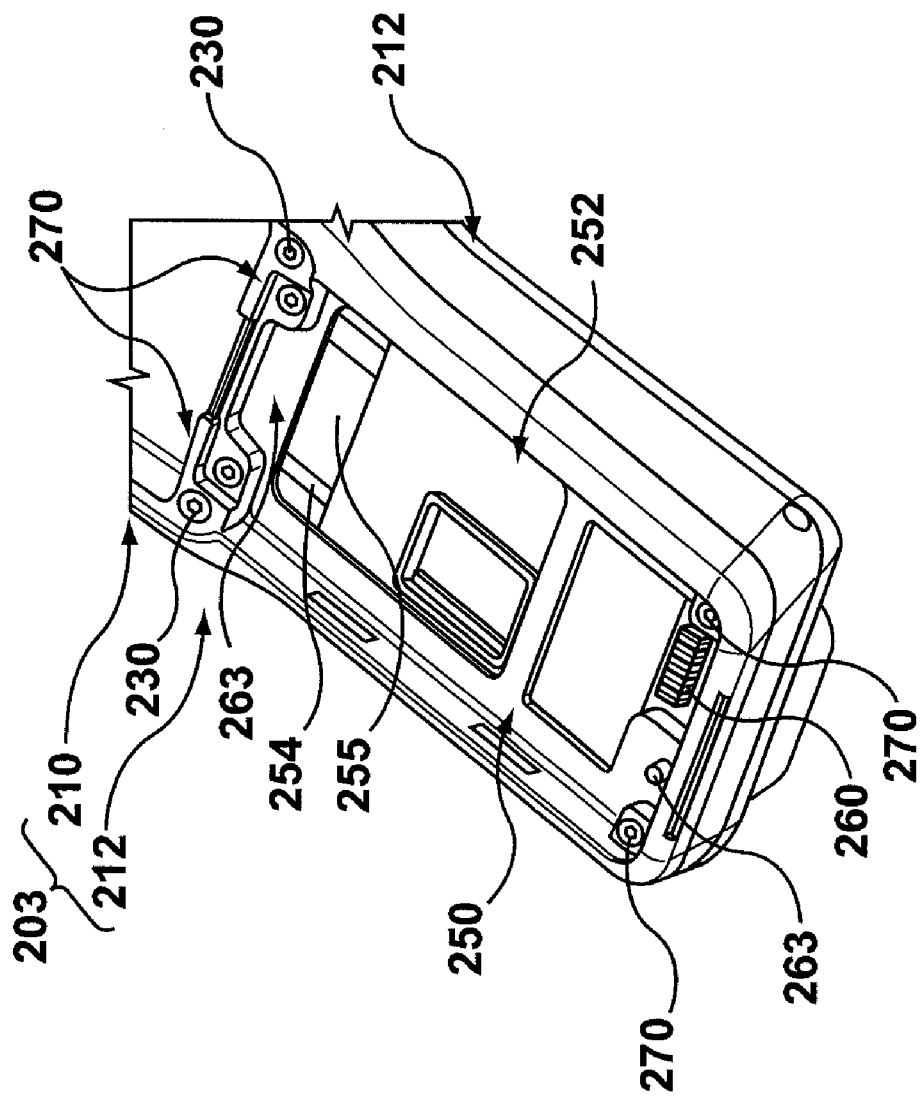
FIG. 7 shows a part of a keypad installation structure for the handheld terminal of FIG. 1, without a keypad printed circuit board.

One or more currently preferred embodiments have been described by way of example. It will be apparent to persons skilled in the art that a number of variations and modifications can be made without departing from the scope of the invention as defined in the claims.

Embodiments of the present invention are described using a handheld terminal having one or more components, such as a display and/or a keypad elastomer or keypad PCB, which are easily re-installable or replaceable. The design of the handheld terminal allows for reinstallation or replacement of the one or more components without disassembling the whole terminal or opening up the terminal and without jeopardizing IP and ruggedness. The customer of the handheld terminal can easily replace/reinstall the components in the field without jeopardizing IP and ruggedness.

Referring to FIGS. 1-8b and FIGS. 21-24, there is shown an example of a handheld terminal. The handheld terminal 202 of the drawings is a portable computer. The handheld terminal 202 includes one or more components that are individually replaceable without disassembling the whole terminal 202, which include, for example, a display or display assembly 204, a keyboard assembly 206.

For clarity and without loss of generality, the side of the handheld terminal 202, having the display 204 and the keyboard assembly 206 is referred to as the front side of the handheld terminal 202. The back side of the device is the side opposite the front.

One of ordinary skill in the art would appreciate that the handheld terminal 202 includes electronics/optics/components/elements not illustrated in the drawings, which may include other components, such as, a beeper, a speaker, a microphone, a scanner, a volume controller, a visual indicator, and a battery component.

One of ordinary skill in the art would appreciate that the handheld terminal 202 includes a main logic board having a main processor for operating the handheld terminal 202. The display 204 and the keyboard assembly 206 are electrically connected to the main logic board (MLB). The main logic board may be connected to the battery component for powering the main logic board and the components of the handheld terminal 202.

The handheld terminal 202 includes a main housing 203 for housing the components of the handheld device 202. The main housing 203 of the handheld terminal 202 includes an upper (front) housing 210 and a lower (back) housing 212. The main housing of the handheld terminal 202 further includes a battery pocket (not shown) for the battery component. In the description, the terms "housing", "cover" and "enclosure" are used interchangeably.

The handheld device 202 has a structure for housing components that includes a housing, for housing the display 204 and a housing, for housing the keyboard assembly 206, as described below. The handheld terminal 202 allows for an individual component to be reinstalled or replaced in the field without disassembling the whole terminal 202.

The structure for the installation of the display 204 is described in detail. The upper housing 210 includes a display pocket 220. The display pocket 220 provides a support for mounting the display 204. The display pocket 220 forms a space 222 in which the display 204 is placed. A display flex connector 224 is placed under the display pocket 220. The display flex connector 224 resides on the main logic board of the handheld terminal 202. The display 204 is placed in the display pocket 220. The display pocket 220 has a window 225 for a connection between the display 204 and the display flex connector 224. The display 204 is connected to the display flex connector 224 using a display flex cable. The display flex connector 224 has a latch for releasably latching the display flex cable.

The display flex cable is customized and is long enough to service the display 204 easily without damaging the display flex cable.

The display 204 is encased by a display boot 226. The display boot 226 is, for example, a rubber boot. A display bezel 228 is placed on top of the display boot 226. The upper housing 210 has six threaded openings or "threads" 230 for removing and securing the display bezel 228 using screw 232. The display bezel 228 has six holes (openings) that correspond to the threads 230 and are aligned with the threads 230 when placed on the display 204. The display bezel 228 is secured to the upper housing 210 using the screws 232 and the threads 230. The screws 232 can be easily removed from the display bezel 228. One of ordinary skill in the art would appreciate that the number of the threads 230 is not limited to six and may vary. The combination of the upper housing 210, the display boot 226 and the display bezel 228 provides a sealing for handheld components so that it meets or surpasses the Ingress Penetration (IP) tests.

The step of replacing the display 204 is described in detail. First the screws 232 are removed from the display bezel 228. The display bezel 228 is removed from the terminal 202. The display 204 encased by the display boot 226 is removed from the upper housing 210. The display 204 is then disconnected from the main logic board of the handheld terminal 202 by opening up the latch on the connector 224.

The structure for the installation of the keyboard assembly 206 is described in detail. The upper housing 210 includes a keyboard pocket 250. The keyboard pocket 250 provides a support for mounting the keyboard assembly 206. The keyboard pocket 250 forms a space 252 in which the keyboard assembly 206 is placed. The keyboard pocket 250 has a window 254 for connection between the keyboard assembly 206 and the main logic board of the handheld terminal 202. A keyboard flex 255 is used to connect a keypad printed circuit board (PCB) 256 to the main logic board of the handheld terminal 202. The keyboard flex 255 is disconnectable from the keypad PCB 256. The keyboard pocket 250 has a portion for a board to board connector 260. The board to board connector 260 is used to connect the keypad PCB 256 to a docking board (302 of FIGS. 8a-8b). The docking board provides the interfacing function for the keyboard flex 255 and the keypad PCB 256.

The keypad PCB 256 is placed in the keyboard pocket 250. The keyboard PCB 256 has a plurality of electrical contacts 258 that are to be electrically connected to the main circuit board via the keyboard flex 255. The keypad PCB 256 includes two holes 262 for alignment. The keyboard pocket 250 has alignment pins 263 for receiving the alignment holes 262. The holes 262 and pins 263 are used to aid the connection between the main logic board of the handheld terminal 202 and the docking board. The holes 262 and the pins 263 are one example for the alignment of the keyboard PCB 256 and the keyboard pocket 250. In another example, the keyboard pocket 250 may have holes and the keypad PCB 256 may have alignment pins for the holes of the keyboard pocket 250. One of ordinary skill in the art would appreciate that the keypad PCB 256 and the keyboard pocket 250 may include alignment structures different from those in the drawings.

The keyboard assembly 206 includes a keypad elastomer 264 that sits on top of the keyboard PCB 256. The keypad elastomer 264 is formed from a single piece of material. The keypad elastomer 264 has a plurality of protrusions 266 that are located above the contacts 258 of the keypad PCB 256. When a keypad is pressed, the contact under the protrusion completes a circuit sending a signal that is used to identify the pressed key.

A keypad bezel 268 is placed on top of the keypad elastomer 264. The upper housing 210 has a four inserts of threads 270 to place the keypad bezel 268 at a right position. The keypad bezel 268 has four holes (openings) corresponding to the threads 270 and aligned with the threads 270 when placed on the keypad elastomer 264. The keypad bezel 268 is secured to the upper housing 210 using screws 272, threads 270, and snaps. The screws 272 can be easily removed from the keypad bezel 268. One of ordinary skill in the art would appreciate that the number of the threads 270 is not limited to four and may vary. The keypad bezel 268 and the housing 203 have complementary snap fit members. The combination of the upper housing 210, the keyboard elastomer 264 and the keyboard bezel 268 provides a sealing for handheld components so that it meets or surpasses the Ingress Penetration (IP) tests.

Figure 20:
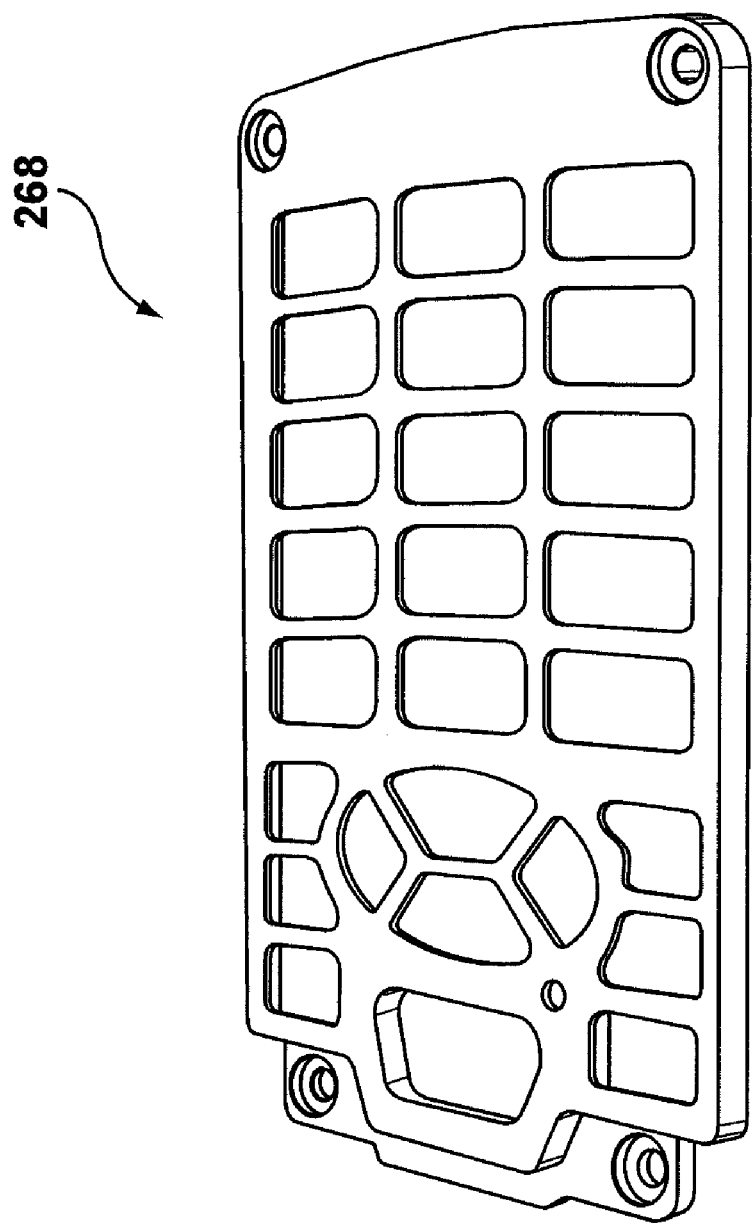
FIG. 20 is a back side view of one example of the keyboard bezel having snap structure.
Figure 21:
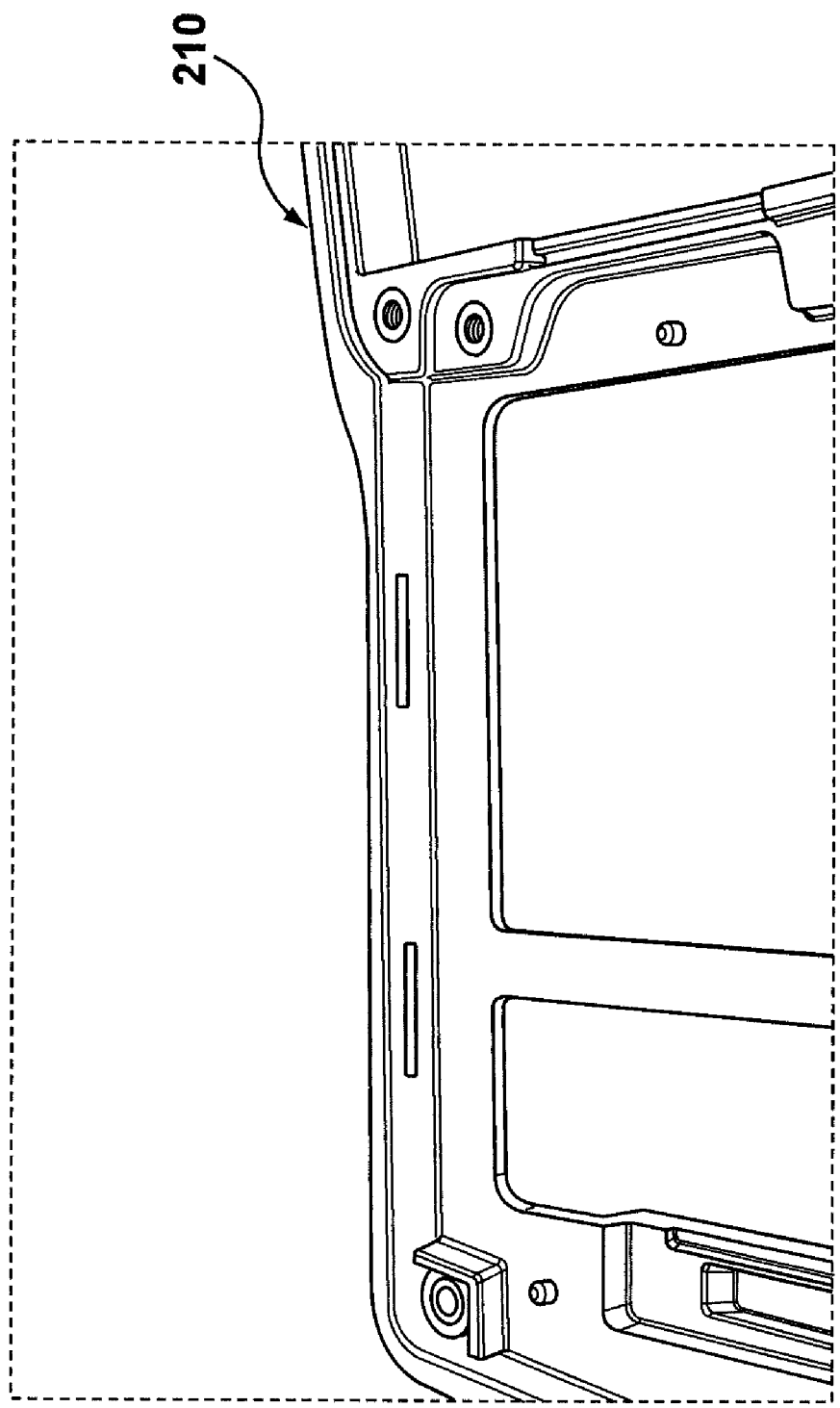
FIG. 21 is a view of one example of the housing having snap structure corresponding to the keyboard bezel of FIG. 20.
Figure 22:
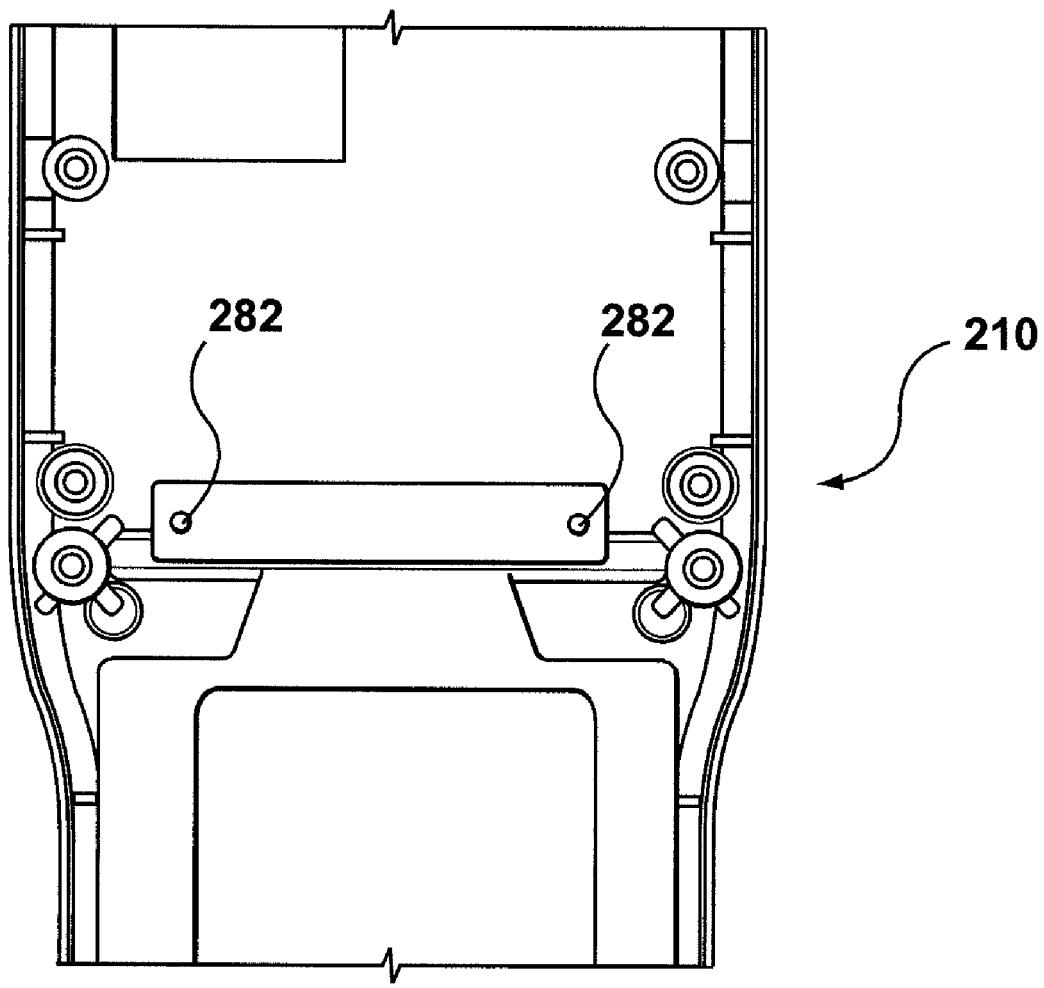
FIG. 22 is a partial back view of one example of the housing.
Figure 23:
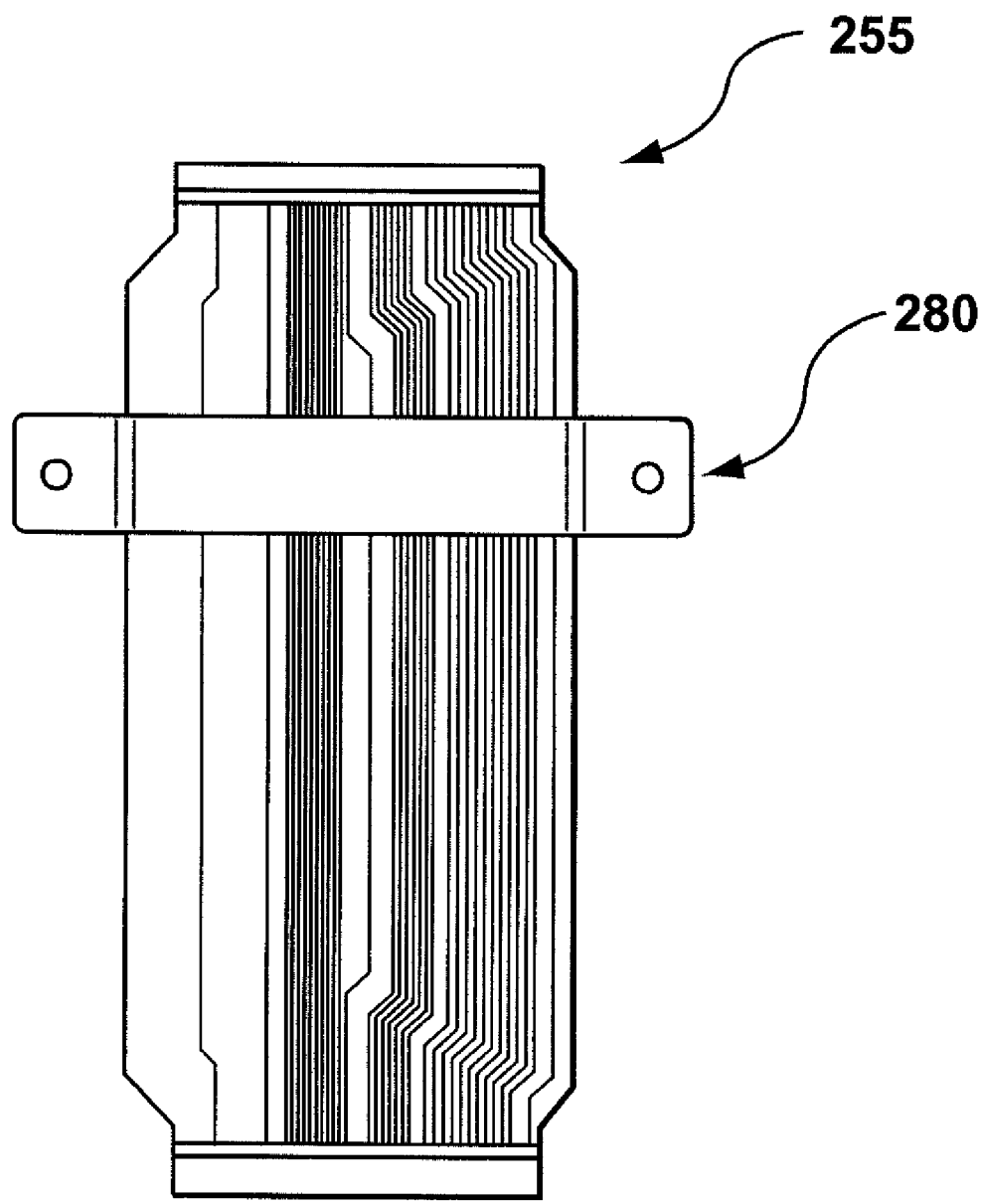
FIG. 23 is a view of one example of a keyboard flex with a retention board.

The step of replacing the keyboard assembly 206 is described in detail. To replace the keypad elastomer 264 and the keypad PCB 256, the screws 272 are removed from the keypad bezel 268. Then, the keypad bezel 268 is removed from the upper housing 210 by disengaging snaps between the keypad bezel 268 and the upper housing 210 (See FIGS. 20 and 21). The keypad elastomer 264 can be now replaced. If the keypad PCB 256 is to be replaced, the keypad PCB 256 is disconnected from the docking board and the main logic board of the handheld terminal 202.

Figure 24:
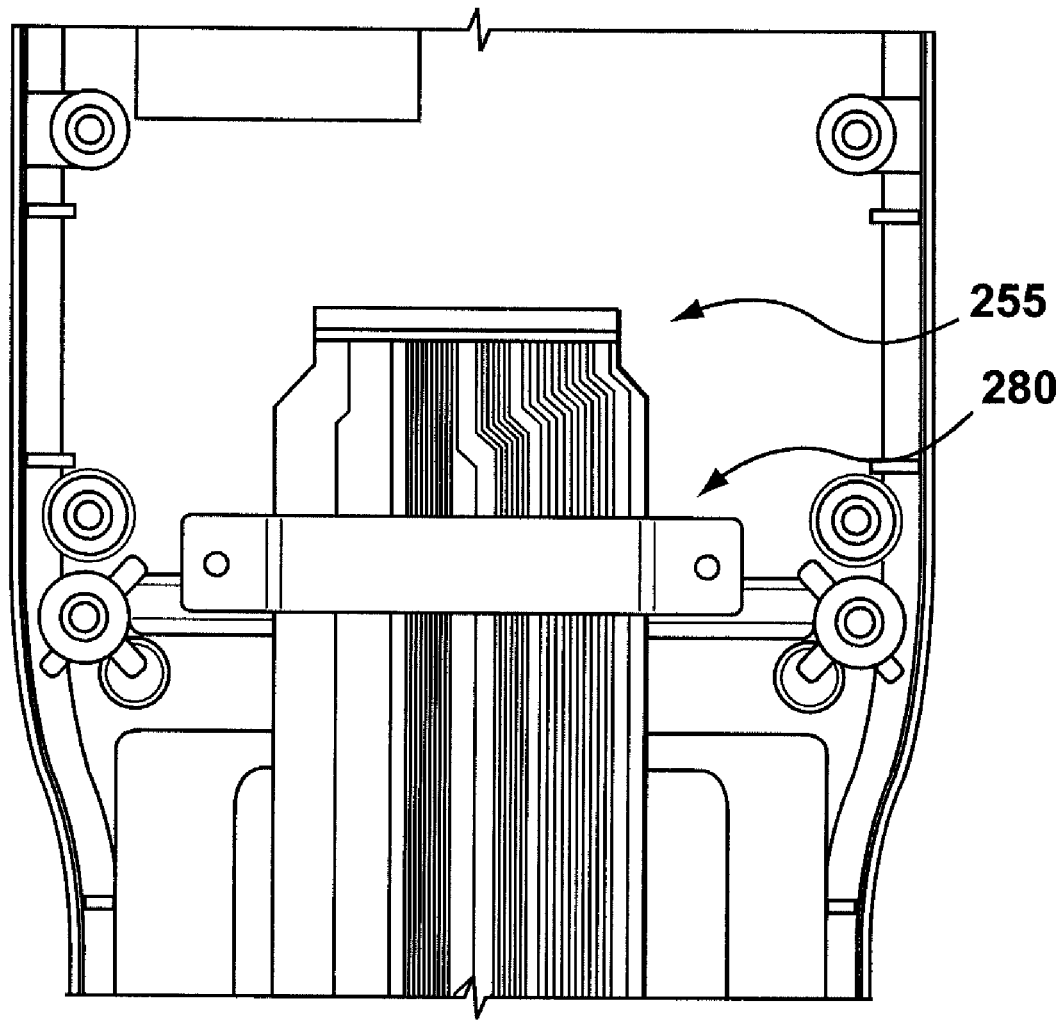
FIG. 24 is a view of the housing of FIG. 22 with a keyboard flex of FIG. 23.

The keyboard flex cable length is customized. It's long enough to service the keyboard assembly easily without damaging the flex. When disconnecting the keypad flex 255 from the keypad PCB 256, it's impossible to disconnect the other side of the flex from the main logic board of the handheld device 202 due to a retention feature (280) designed on the keyboard flex 255 that engages the upper housing 210 (See FIGS. 22-24). Service loops of the flexes are maintained to prevent traces from being damaged. In FIG. 24, a retention board 280 is engaged with a member 282 in the housing. For example, the retention board 280 has holes, and the member 282 on the housing includes pins for alignment with the holes.

Referring to FIGS. 8a-8b, there is illustrated an example of a docking connector 300. The docking connector 300 includes a connector board (package) 302 and a connector plate (holder) 304. The connector board 302 has holes 306, and the connector plate 304 has holes 308. The connector board 302 is assembled with the connector plate 304 by tightening screws 310 into the holes 306 and 308. The connector board 302 includes connector electronics/pins 312 for coupling the board to board connector (260 of FIG. 7) and the keyboard flex (255 of FIGS. 23-24), and also include connector electronics/pins 314 for coupling the handheld terminal to another device, such as another computer, power source, or printer. The connector plate 304 includes a window 316. The edge of the window 316 is sealed by a gasket 318 for sealing. The connector plate 304 has holes 320, which are fastened to the main housing 203 by tightening screws into the holes 320. The docking connector allows the handheld device to be connected to peripherals such as printers or to other computer systems to download/upload information. The connector board 302 can be easily replaced in the field by removing the connector plate 304 from the main housing 203.

The design of the handheld terminal 202 described herein provides for individually replaceable components, which provides greater life-span for the handheld terminal since a component is individually replaceable. The replacement of the individual components can be easily accomplished in the field without jeopardizing IP and ruggedness.

FIGS. 9-18 illustrate an example of a portable terminal having easily detachable component as described above. The portable terminal of FIGS. 9-18 has a handheld computer that is capable of detachably coupling to one or more peripherals (e.g., handle). The portable terminal with the handle allows for optimized target viewing for a user, and thus allows for simultaneous scan/data-collection and visual confirmation of the scan/data-collection result. This reduces user fatigue and forestalls potential employee loss work time due to claims of carpal tunnel syndrome (CTS), and improves productivity. The portable terminal also allows for expansion of additional functions/features without adding them into the data capture devices. The expansion may include, but not limited to, RFID readers/writers, scanners, imagers, GPS modules, Wireless Wide Area Network (WWAN) Radios. One of ordinary skill in the art would appreciate that the portable terminal 10 may include components/electrics/modules not illustrated in FIGS. 9-18.

Portable Terminal (10)

Referring to FIGS. 9-18, there is shown one example of a portable terminal 10. The portable terminal 10 has functionality for providing imaging and/or scanning features in data capture/communications 12 and asset tracking/management, for example in wireless communication 14 with tracking objects 16 (e.g. barcode labels and/or RFID tags) present in one or more logistics environments 18 (e.g. industrial, retail, supply chain). The tracking objects 16 can be attached to products that are being transported from one location to another in the logistics environment 18. Examples of these environments 18 can include such as but not limited to: front store retail and/or warehousing for mobile stock checking, price checking, and merchandising; and utilities for meter reading, surveying, parking enforcement, and asset tracking.

The portable terminal 10 can have an optional handle 20, connected via a tool less release securable connection 22, to a lower housing (e.g., 212 of FIGS. 1 and 7) of a handheld computer 24. The handle 20 is attached to the lower housing by engaging means having protrusions engaged in slots and a thumb latch mechanism.

The computer 24 has a number of components 19 including, for example, a user interface 26, including a keyboard 28 and a display 30 (e.g. touch screen), one or more onboard processors 32 (e.g. inside of the enclosure 23), and a scanner/radio communications module 34 (e.g. laser, WLAN with VoIP and Bluetooth, imager, etc.—inside of the enclosure 23) for facilitating the wireless communication 14. The portable terminal 10 also has an onboard power source 36 for helping to satisfy power requirements of the onboard processor(s) 32, the user interface 26, and optionally the communication module 34.

The portable terminal 10 can employ a keyboard installment structure and a display installment structure same or similar to those of FIGS. 1-9. A keyboard bezel (e.g. 268 of FIG. 4) is used to hold the keyboard, and a display bezel (e.g. 228 of FIG. 1) is used to hold the display. The keyboard bezel and the display bezel are secured on the cover of the handheld computer 24, by, for example, screws, and can be easily removed.

Figure 9:
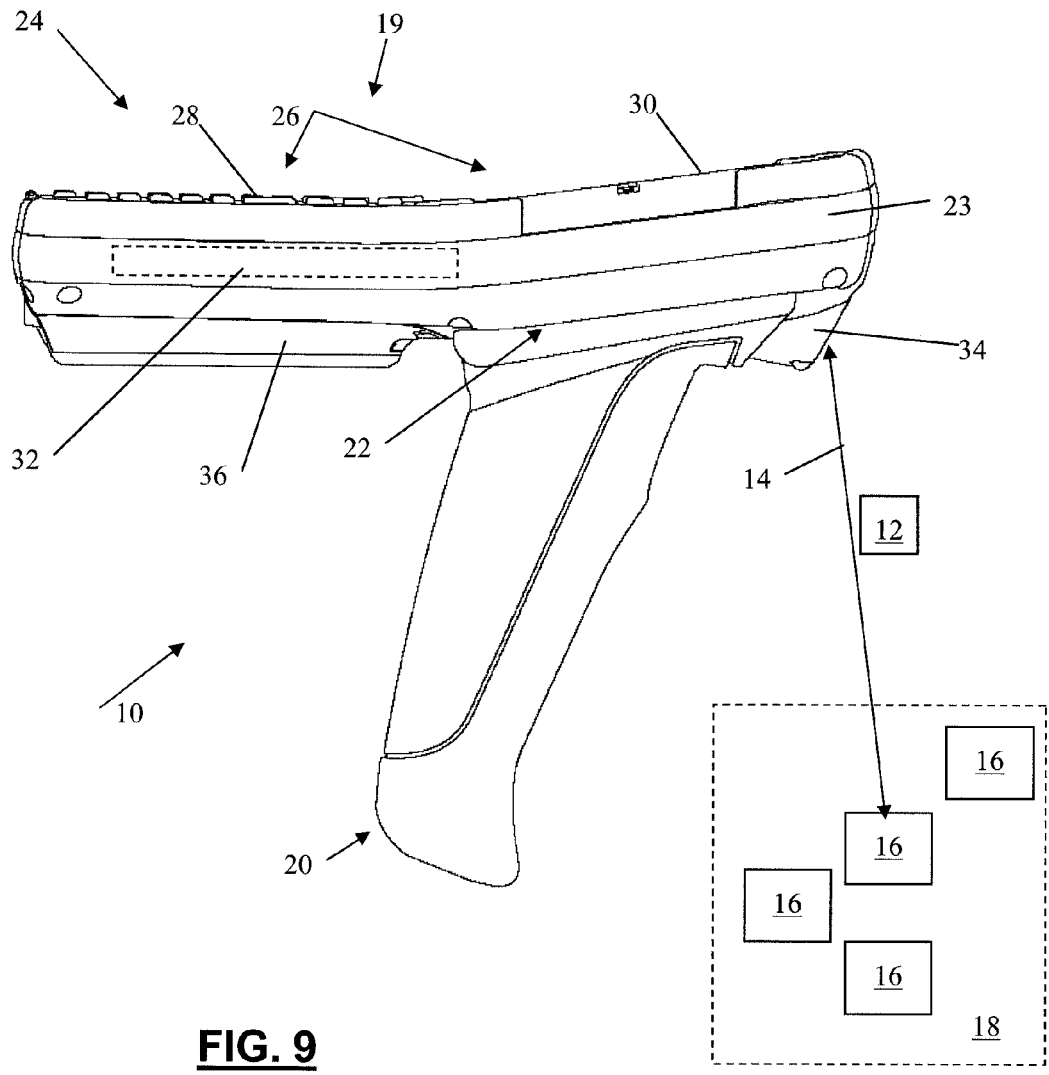
FIG. 9 is a side view of an example of a portable terminal with a pistol grip.

The computer 24 can be operated as a stand-alone device. The computer 24 has a coupling connection that acts as an expansion connector for providing an interface to a peripheral (e.g., handle 20), as described in detail below. In FIG. 9, the computer 24 is docked into the handle 20, through the coupling connection of the computer 24. The coupling connection of the computer 24 includes, for example, an electrical coupling for electrically coupling to the peripheral and a mechanical coupling for releaseably coupling to the peripheral. The peripheral is assigned "resistive values" which are identified by the computer 24 via the expansion connector when connected to the computer 24. Software resident in the computer 24 detects the handle 20 and its embedded peripheral.

The handle 20 has a coupling connection for electrically and mechanically coupling to another device, such as computer 24 or another peripheral. The coupling connections of the computer 24 and the handle 20 act as a carrier for add-on features (e.g., RFID, scanners, imagers, GPS modules, WWAN radio etc). This keeps the design of the handheld terminal 10 simple.

In addition, the mechanical design of the computer 24 and the handle 20 allows optimized target viewing, for example, at a range of approximately 12 to 14 inches. The angle between the viewing area of the display 30 and a scanner beam from the scanner/radio communications module 34 is optimized to provide the user with line-of-sight of the beam target while also viewing the display screen without manually tilting the device to view. This eliminates the need to constantly adjust the angle of the computer 24 (i.e., manually tilting it towards the user) to check whether a scan has been registered. This would also reduce user fatigue and forestall potential employee's loss work time due to claims of carpal tunnel syndrome (CTS).

Figure 10:
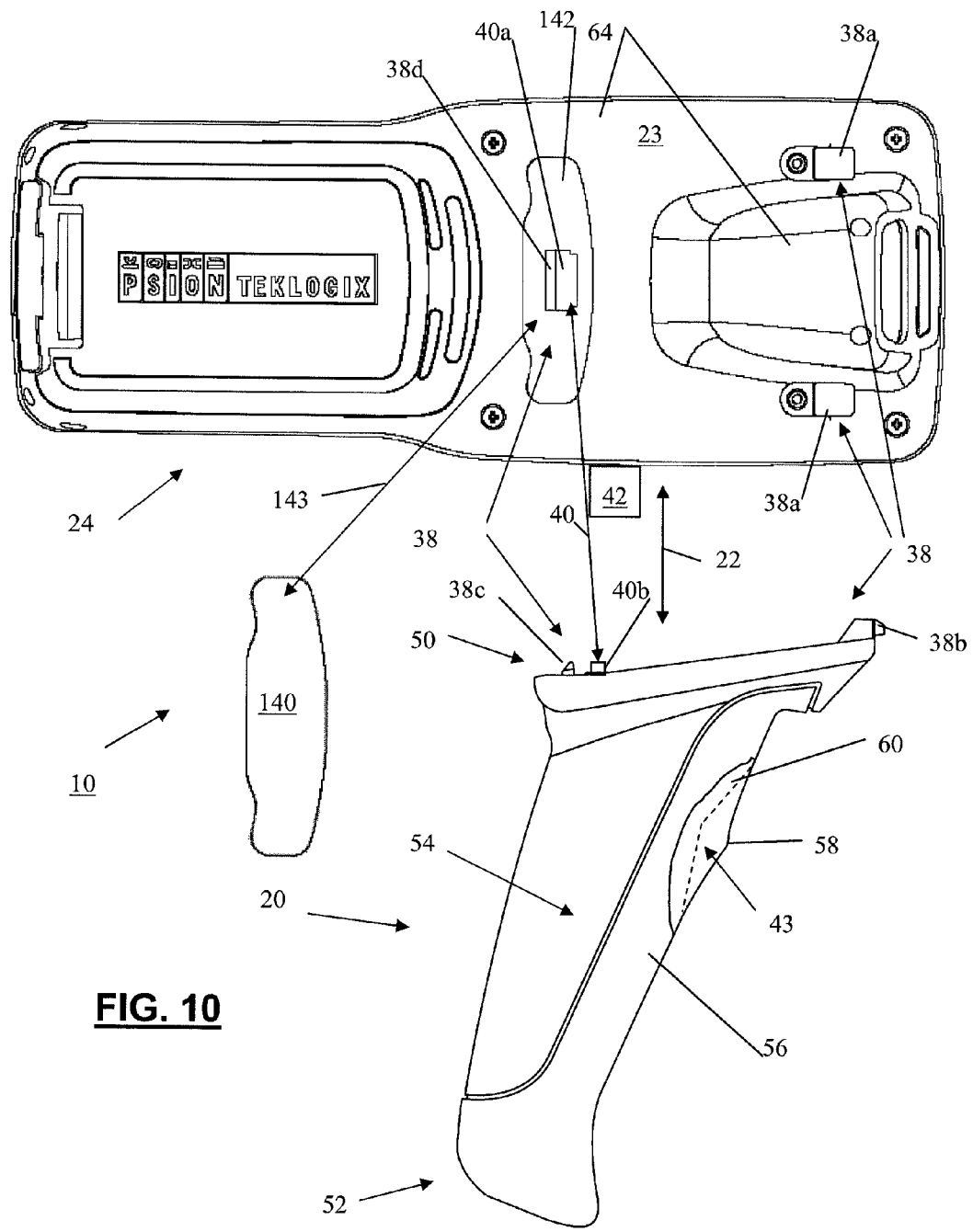
FIG. 10 is a back view of the handheld computer and a side view of the pistol grip of FIG. 9.
Figure 11:
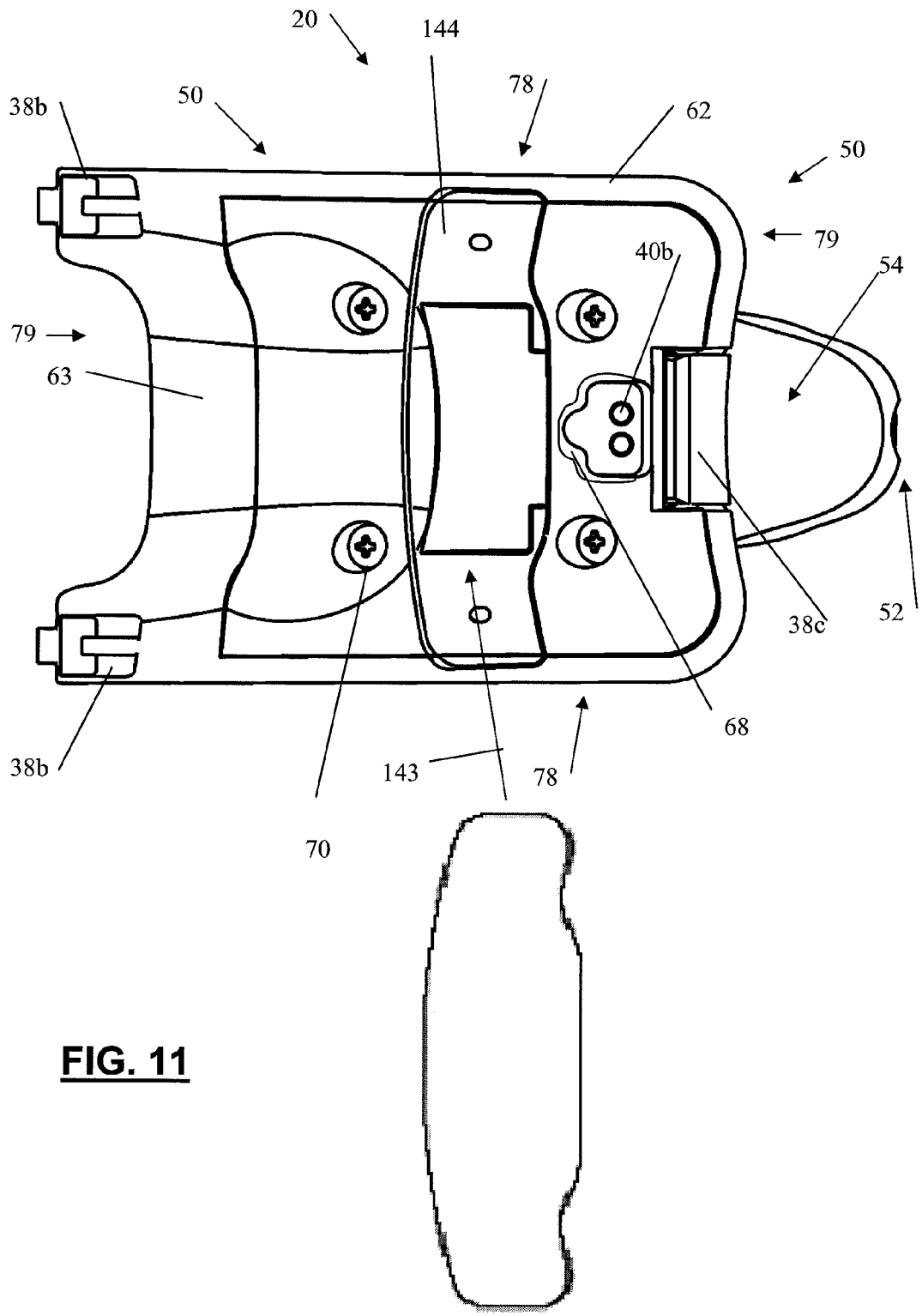
FIG. 11 is a front view of a proximal portion of the pistol grip of FIG. 9.
Figure 12:
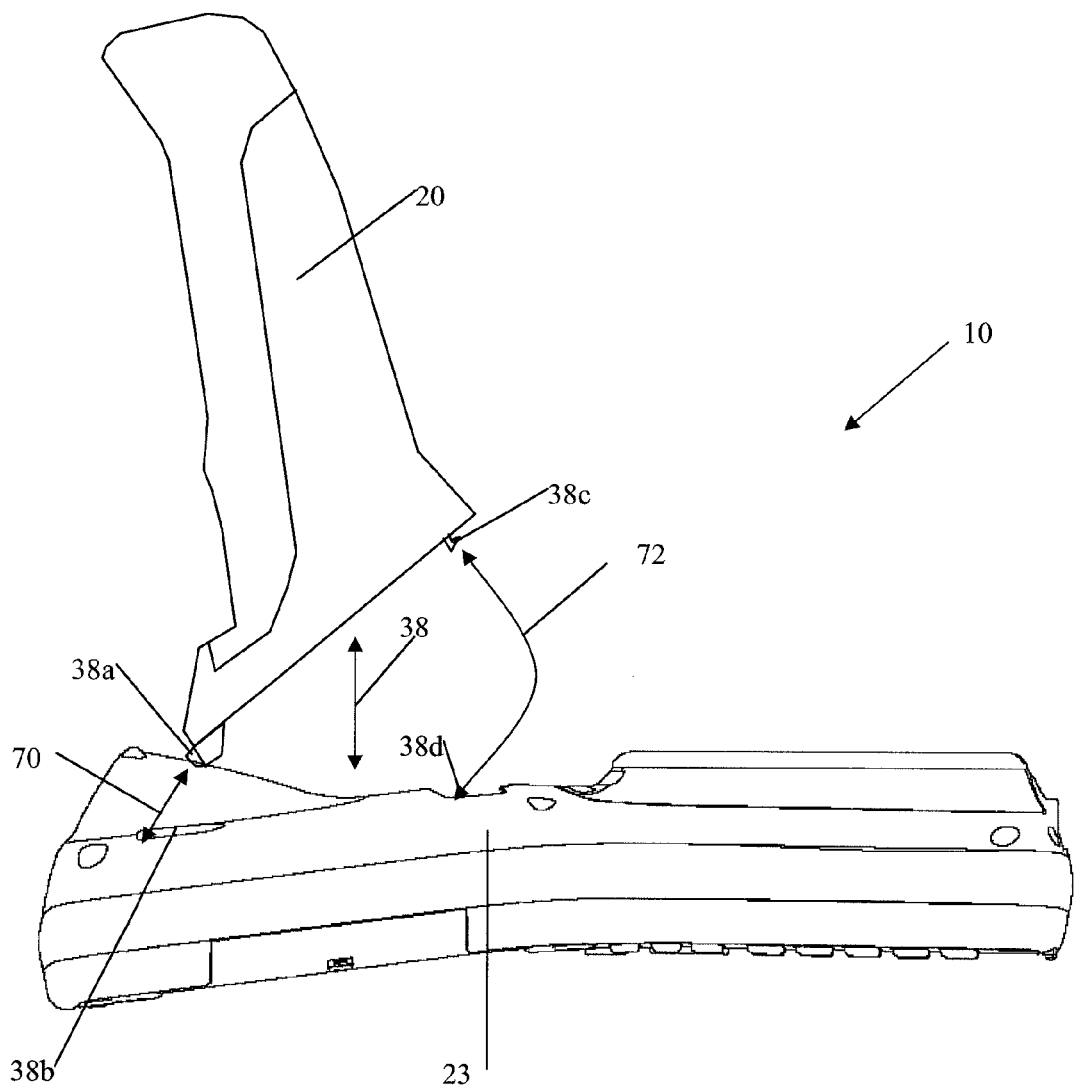
FIG. 12 is another side view of the portable terminal and the pistol grip of FIG. 9.

Referring to FIGS. 10-11, the handle 20 is shaped for grasping by a hand (not shown) of a user of the portable terminal 10, a body 21 of the handle 20 having a proximal end 50 for coupling to a device (e.g., computer 24), a distal end 52, and a grip portion 54 between the ends 50, 52 for grasping by the hand of the user. In this example, the enclosure 23 of the computer 24 is coupled to the proximal end 50.

The handle 20 is a pistol grip sled. In the disclosure, the terms "handle", "pistol grip", "pistol grip sled" are used interchangeably.

The grip portion 54 has an overmold portion 56, preferably made of a resiliently flexible material (e.g. rubber or other suitable polymers), for enhancing the grip of the user's hand on the body 21 of the handle 20. The overmold portion 56 can be referred to as an additional layer formed around the first part (e.g. body 21) that can be a previously molded part that is reinserted into a secondary mold for forming the additional layer on the previously molded part. For example, after injection and forming of the first molded part, i.e. the body 21. The second mold cavity is different from the first mold cavity in that the detail for the second molded part is included and used to add the overmold potion 56. The material (e.g. rubberized polymer) for the second molded part (i.e. the overmold 56) is then injected into the second mold cavity detail before the completed part (i.e. handle 20 and overmold portion 56) is ejected from the second mold. One example embodiment of the handle 20 is where the body 21 is made of a hard/rigid plastic material (e.g. thermoplastic polymer) while the overmold 56 is made of a softer, resilient material (e.g. thermoplastic elastomer (TPE) materials) that is adhered to the material/substrate (e.g. polypropene (PP), acrylonitrile-butadiene-styrene (ABS), polycarbonate (PC), Nylon etc.) of the body 21, thus facilitating a combined comfortable, non-slip, and abrasion-resistant grip portion 54 of the handle 20. Other fabrication methods can be used to assemble the overmold 56 to the body 21 of the handle 20, as known to a person skilled in the art. The proximal end 50 can be attached to the grip portion 54 of the body 21 via a plurality of fasteners 70 (e.g. screws), see FIG. 11, which can be configured to releasably secure the proximal end 50 to the grip portion 54, as desired.

The handle 20 also has an actuator assembly 43 (shown in dotted lines underneath the overmold portion 56). The actuator assembly 43 can have a raised portion 58, for facilitating user identification of the actuator assembly 43 underneath the overmold 56. Alternatively, or in addition, the overmold 56 can have an indicator section 60 for indicating to the user the location of the actuator assembly 43 on the grip portion 54 underneath the overmold 56. The indicator section 60, can have a material texture, color, and/or shading different from other material of the overmold 56.

The proximal portion 50 of the handle 20 has a first surface 62 configured for mating with a second surface 64 of the enclosure 23 of the computer 24, such that a depression portion 63 of the first surface 62 can be configured to accommodate the shape of the enclosure 23 surrounding the communications module 34 (see FIG. 9). Maintaining the mating of the first surface 62 with the second surface 64 is facilitated by the connection 22, as further described below.

Connection (22) Configuration

Referring to FIG. 10, the handle 20 is shaped for grasping by a hand (not shown) of a user of the portable terminal 10. The handle 20 is coupled to the computer 24 via the connection 22, which includes both a mechanical coupling 38 for retaining the handle 20 as physically attached to the enclosure 23 (e.g. frame, pocket) and a control coupling 40 for facilitating communication (e.g. instruction/control signals 42) between the actuator assembly 43 (e.g. trigger) of the handle 20 and one or more components 19 of the computer 24. For example, the main logic board of the computer 24 or the onboard processors 32 are operably coupled to the handheld 20 via the control coupling 40, and the components 19 (e.g., scan, display, keyboard) are operated by the main logic board or the onboard processors 32, based on instructions/commends received from the control coupling 40. The handheld 20 may include one or more components that operate based on instructions/commends received from the computer 24 via the control coupling 40.

Control Coupling (40)

Further, for example, the control coupling 40 can be configured to include an electrical contact 40a (e.g. printed circuit board (PCB) connectors such as electrically conductive pads) coupled to one or more components 19 of the computer 24 and a mating electrical contact 40b (e.g. pogo pins) coupled to the actuator assembly 43, as further described below.

The electrical contact 40b is configured to establish a temporary operative electrical connection between the actuator assembly 43 and one or more components 19 of the computer 24 via the electrical contact 40a. For example, the pogo pin can take the form of a slender cylinder containing two spring-loaded pins, such that when pressed between two electronic circuits (e.g. of the computer 24 via the electrical contact 40a and the actuator assembly 43), points at each end of the pogo pin make secure electrical contacts with the two electronic circuits and thereby connect them together. The actuator assembly 43 is configured for affecting the operation of one or more of the components 19 of the computer 24 via the instruction/control signals 42 generated through physical interaction (e.g. depressing of the trigger) of user with the actuator assembly 43. Further, an optional seal 68 (e.g. made of resilient material such as but not limited to rubber and other resilient polymers) can be positioned around a periphery of the contact(s) 40a, 40b (e.g. see FIG. 11) as part of the control coupling 40, in order to inhibit the ingress of water or other foreign matter between the contacts 40a, 40b when the handle 20 is coupled to the enclosure 23 via the mechanical coupling 38.

Mechanical Coupling (38)

For example, the mechanical coupling 38 can be configured to include one or more slots 38a and mating protrusions 38b (with lip 45) and one or more latches 38c (with lip 45) and corresponding slots 38d on opposing sides 79 of the proximal portion 50, as further described below. The slots 38a can be located on the enclosure 23 and the protrusions 38b located on the handle 20 as shown, the slots 38a can be located on the handle 20 and the protrusions 38b located on the enclosure 23 (not shown), or a combination thereof. Further, the latch(es) 38c can be located on the handle 20 and the corresponding slot(s) 38d on the enclosure 23 (as shown), the latch(es) 38c can be located on the enclosure 23 and the corresponding slot(s) 38d on the handle 20 (not shown), or a combination thereof.

Referring to FIG. 12-14b, the mechanical coupling 38 is configured so as to facilitate attachment of the optional handle 20 to the enclosure 23 without the aid of additional tools and corresponding fasteners (e.g. screwdrivers and screws, etc.). Further, the mechanical coupling 38 is configured so as to be compatible with a specified drop rating of the portable terminal 10, while facilitating the retention of the handle 20 to the enclosure 23, once attached, until subsequently released by the user through operation of the latch(es) 38c. The pistol grip may disengage, but it will not be damaged where the user can reinstall and it will work properly. In order to attach the handle 20 to the enclosure 23, the protrusions 38b can be engaged/inserted 70 into the slots 38a (resulting in contact of the lips 45 with an interior surface 25 (e.g. of the enclosure 23) that is adjacent to the slots 38b), and then the handle 20 can be pivoted 72 about the engaged slots and protrusions 38a and 38b towards the enclosure 23 so as to engage the latch(es) 38c with the corresponding slot 38d (resulting in contact of the lip 45 with the interior surface 25 that is adjacent to the slot 38d).

Once engaged, the first external surface 62 of the proximal portion 62 is located adjacent to the second external surface 64 of the enclosure 23 (see FIGS. 10-11). The engagement of the latch(es) 38c with the slot(s) 38d also causes the mating of the electrical contacts 40a,b in order to provide or otherwise enable the control coupling 40.

Referring to FIGS. 13a, 13b, 14a, and 14b, the latch 38c has a protrusion 44 (that projects transversely from the surface 62—see FIG. 11) with a lip 45 configured for engaging 72 (see FIG. 12) with the slot 38d (FIG. 10). An arm 46 is formed in the body 21 with a slit 80. The protrusion 44 is extended from the arm 46. The arm 46 and the protrusion 44 are resilient and bendable. The positioning of an abutment surface 55, further described below, restricts travel of the arm 46 within a gap 59 during the engagement 72 of the latch 38c with the corresponding slot 38d, as well appreciated by one of ordinary skill in the art.

Figure 13A:
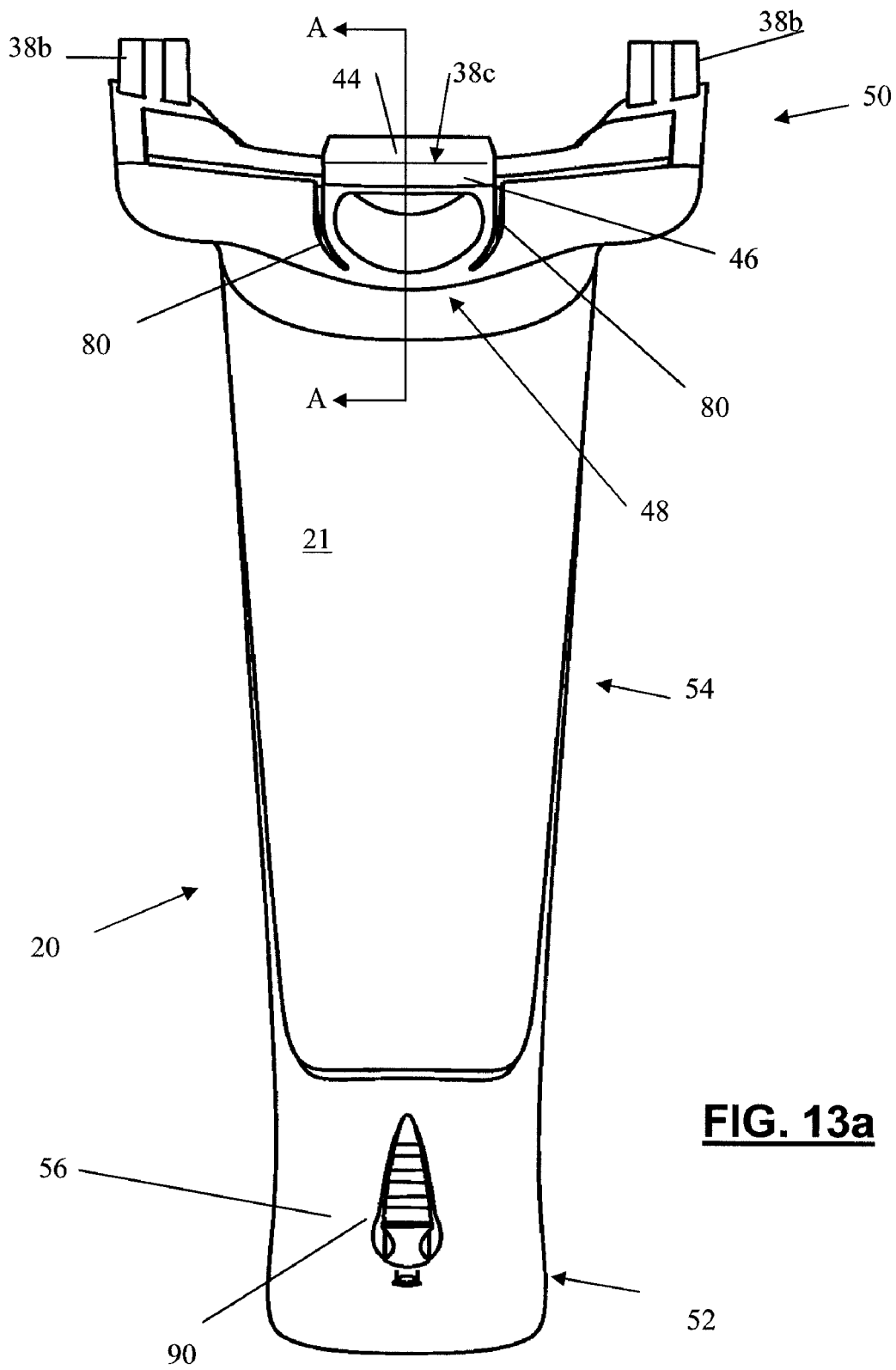
FIG. 13a is another view of the pistol grip of FIG. 9.
Figure 13B:
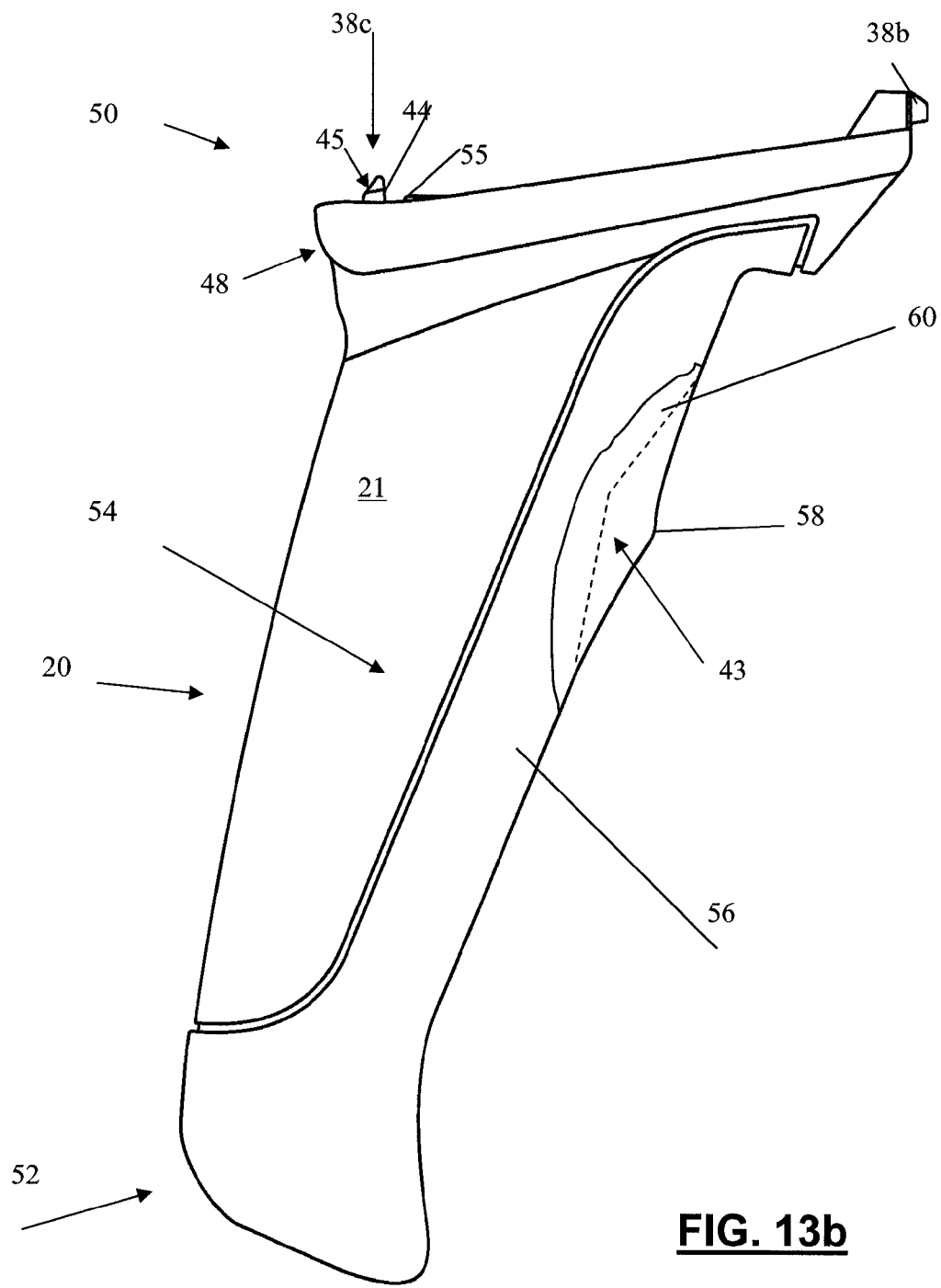
FIG. 13b is a further view of the pistol grip of FIG. 9.
Figure 14A:
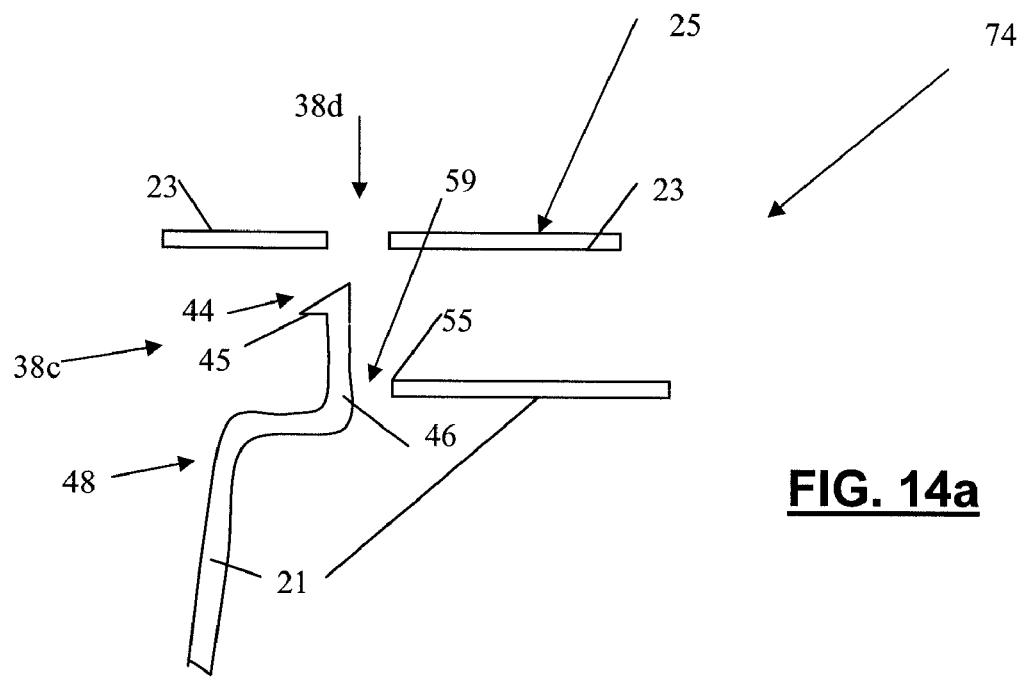
FIG. 14a is a view illustrating a mechanical coupling of the portable terminal and the pistol grip of FIG. 9.
Figure 14B:
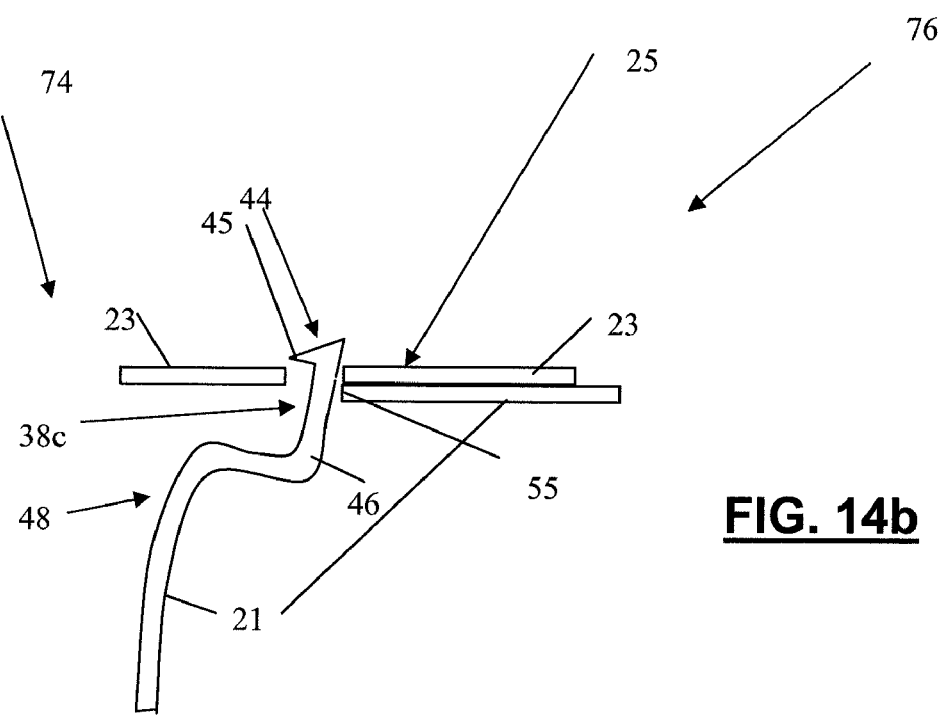
FIG. 14b is another view illustrating the mechanical coupling of the portable terminal and the pistol grip of FIG. 9.
Figure 15:
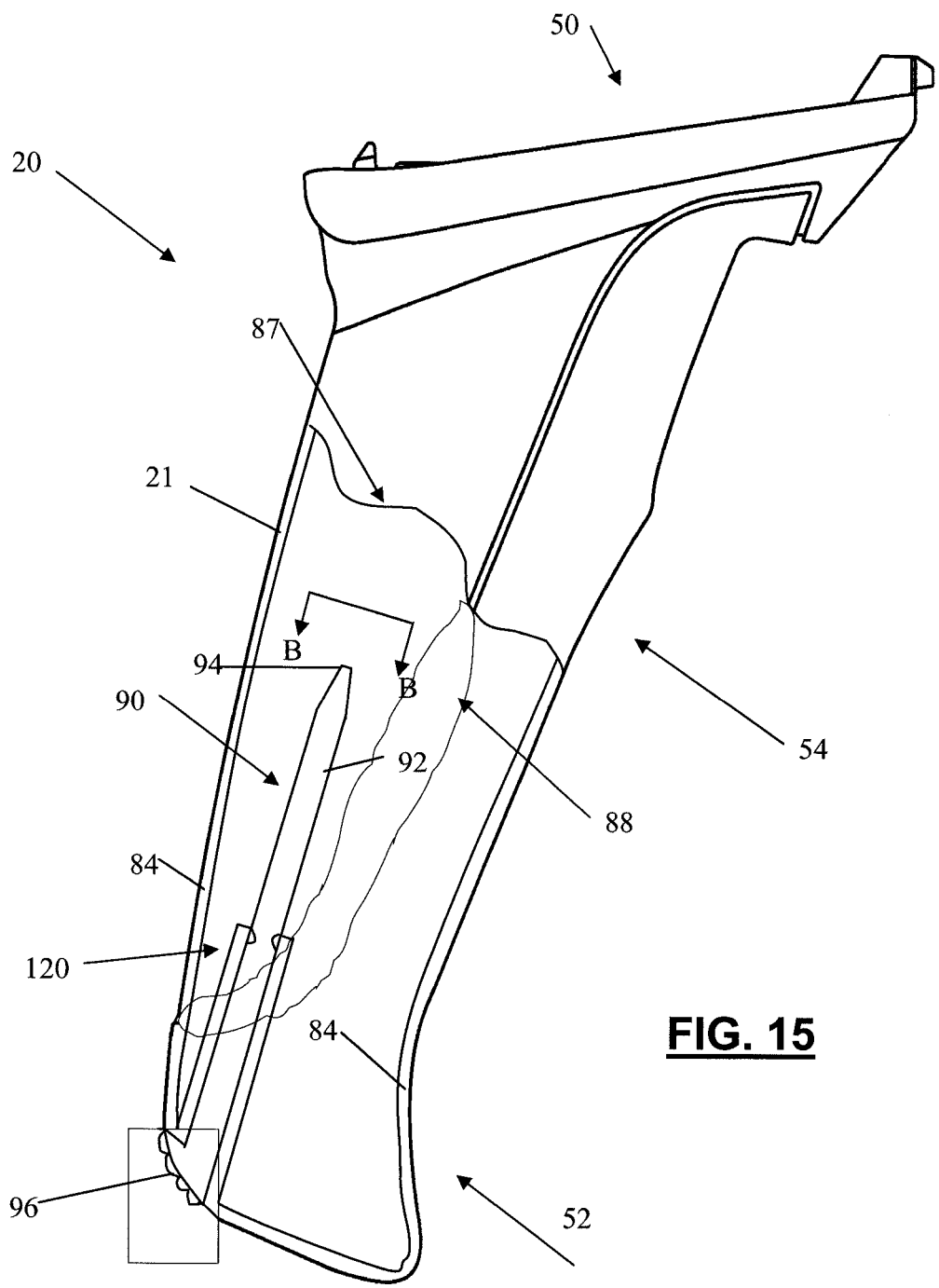
FIG. 15 is a further view of the pistol grip of FIG. 9.

The force applied to the thumb latch is used to move the arm 46 towards a first position 74 (see FIG. 14a by example) as compared to a second position 76 (see FIG. 14b by example), whereby positioning of the latch 38a towards the abutment surface 55 in the second position 76 facilitates engagement 72 of the protrusion 44 with the slot 38d while positioning of the latch 38a away from the abutment surface 55 of the first position 74 facilitates the retention of the protrusion 44 in the slot 38d via the interaction between the lip 45 and the inside surface 25 of the slot 38d, once engaged 72 and until removed 72. For example, FIG. 14a shows the position of the latch 38c in the first position 74 and external/unengaged with the slot 38d, while FIG. 13b shows the position of the latch 38c in the second position 76 (towards the abutment surface 55) and internal/engaged with the slot 38d. Subsequent release of the latch 38c by the user results in displacement 57 of the latch 38c away from the abutment surface 55 and then contact occurs with the arm 46 with a side of the slot 38d, thus providing for a releasably secure engagement 72 of the handle 20 with the enclosure 23, until the latch 38c is subsequently displaced 57 towards the second position 74 and the protrusion 44 is removed 72 from the slot 38d to provide for detachment of the handle 20 from the enclosure 23.

In view of the above, the protrusion 38b is engaged 70 with the latch 38a, and then slot 38d is engaged 70 with the latch 38c. The engagement 70 is performed before the engagement 72.

Actuator Assembly (43)

Referring again to FIGS. 10, 15 and 16, the actuator assembly 43 is configured for affecting the operation of one or more of the components 19 of the computer 24 via the instruction/control signals 42 generated through physical interaction (e.g. depressing of the trigger) of the user with the actuator assembly 43. As is shown by example, the grip portion 54 has the overmold portion 56, preferably made of a resiliently flexible material, for enhancing the grip of the user's hand on the body 21 of the handle 20. The actuator assembly 43 (shown in dotted lines underneath the overmold portion 56) has a raised portion 58, for facilitating user identification of the actuator assembly 43 underneath the overmold 56. The raised portion 58 projects in a direction transverse or otherwise extending outwards from the surface of the grip region 54, and can be optionally covered by the overmold 56.

The overmold 56 can be used to cover a gap 131 around an actuator body 120 and the opening of the adjacent wall 84, in which the actuator body 120 is positioned, so as to inhibit foreign matter (e.g. water) penetration into the interior 88 of the body 21. The overmold 56 can only be adhered to the body 21 of the handle and not to the actuator body 120, thus providing for unhindered actuation/displacement of the actuator body 120 with respect to the handle body 21. Otherwise, in the case where the overmold 56 is also adhered to exterior surfaces 138 of the actuator body 120 and the handle body 21, the overmold 56 material is sufficiently resilient/elastic in nature to provide for corresponding actuation/displacement of the actuator body 120 with respect to the handle body 21, in order to result in sufficient switching of the switch 134 by a control arm 132.

Figure 16:
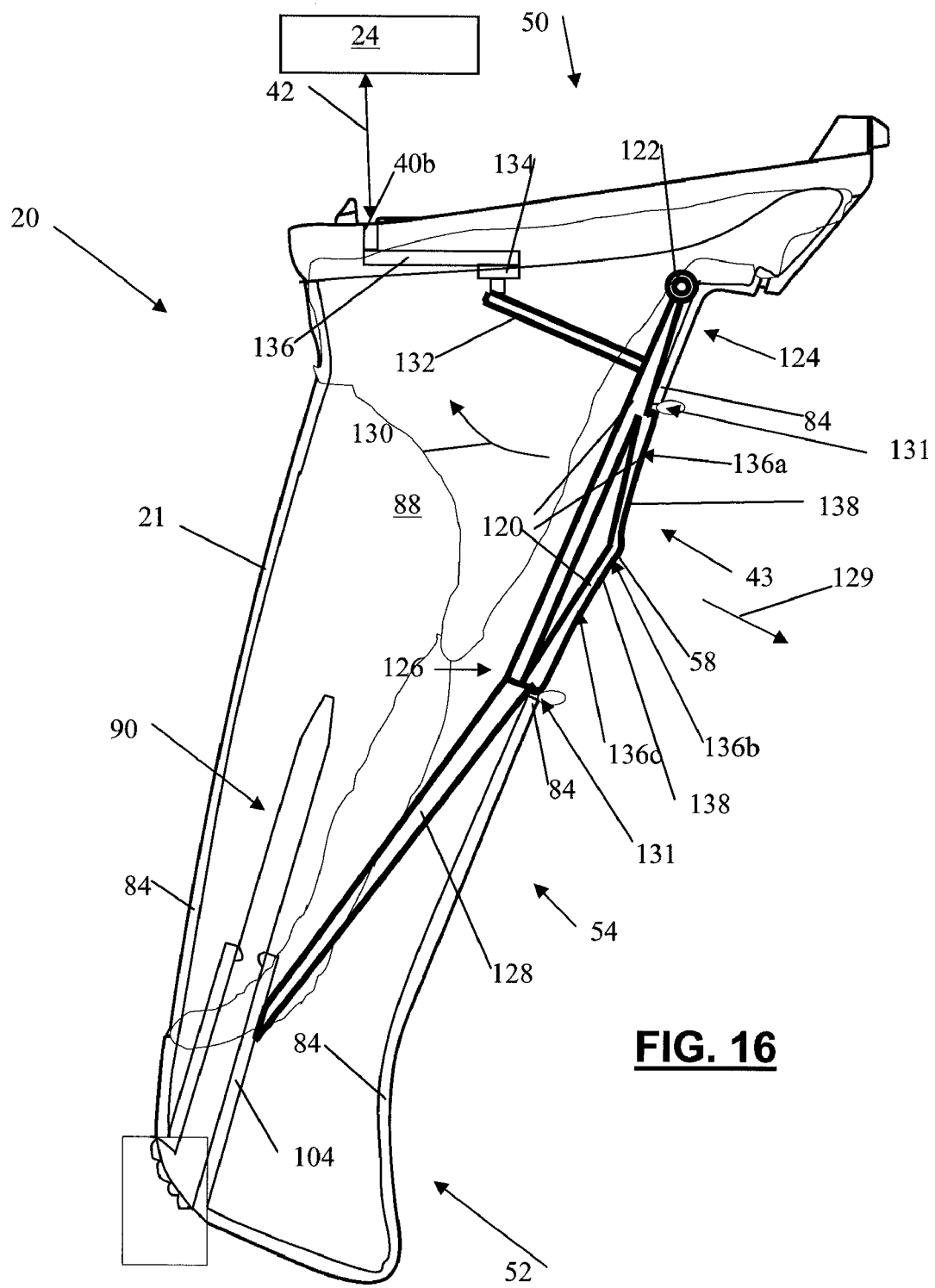
FIG. 16 is a further view of the pistol grip of FIG. 9.
Figure 17:
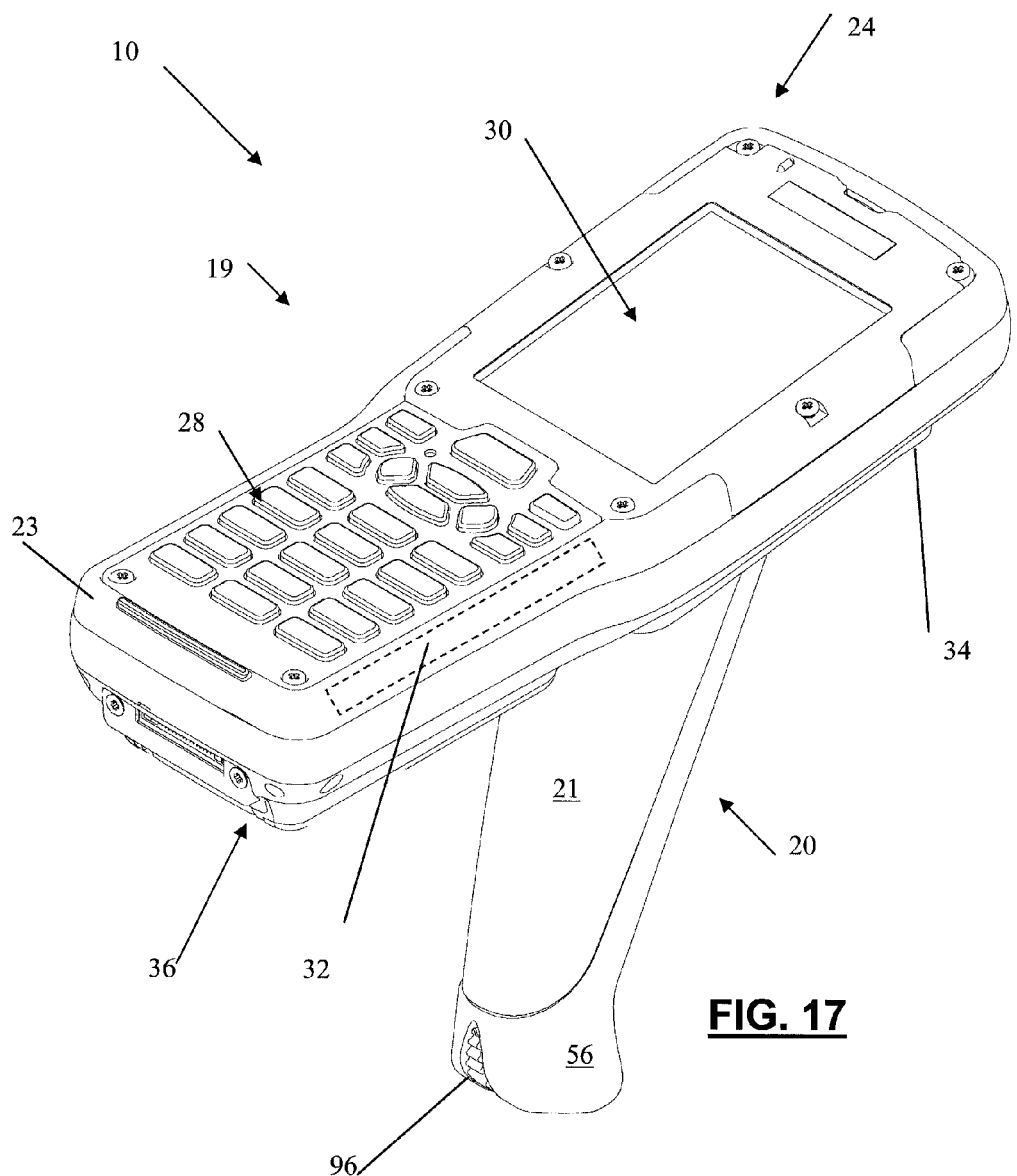
FIG. 17 is a perspective top view of the portable terminal with the pistol grip of FIG. 9.
Figure 18:
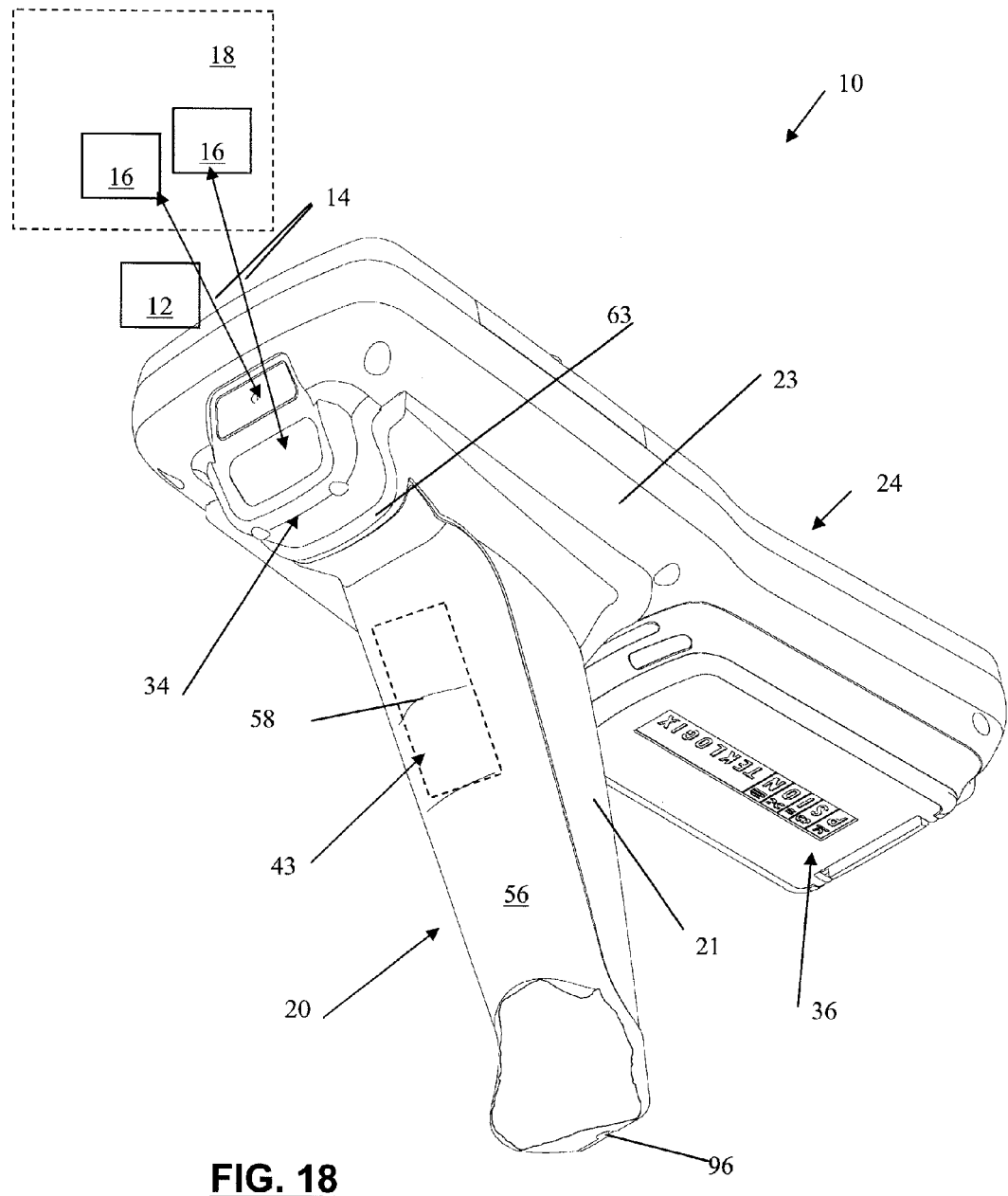
FIG. 18 is a perspective bottom view of the portable terminal with the pistol grip of FIG. 9.

Referring to FIG. 16, shown is the example actuator assembly 43 with the overmold 56 and exterior shell of the body 21 removed to show the interior 88 of the handle 20. The actuator assembly 43 has the actuator body 120 connected to the body 21 at one end 124 by a pivot point 122 and at another end 126 to a biasing member 128 (e.g. spring). The biasing member(s) are configured for biasing the actuator body 120 towards an unactivated/unactuated position 129 (e.g. the position at which the control signals 42 are not generated). The biasing member 128 also comes in contact with the body 21 (e.g. the arm 104). Depression of the actuator body 120 in a direction 130, about the pivot point 122, from the biased position 129 causes the control arm 132 (connected to the actuator body 120) to activate/depress the switch 134. Activation of the switch 134 generates the control signals 42, or otherwise causes a circuit 136 (optional) to generate the control signals 42. The control signals 42 are communicated via the electrical contact 40*b* to the computer 24, when coupled to the handle 20 (see FIG. 9). The switch 134 and the optional circuit 136 are also mounted on the body 21 of the handle 20.

Referring again to FIG. 16, the actuator body 120 has a plurality of trigger regions 136*a*, 136*b*, 136*c* for contact by the user's hand, in order to actuate the actuator mechanism 43. For example, the user can: put pressure on the actuator region 136*c* to cause the switch 134 to be depressed; put pressure on the actuator region 136*b* to cause the switch 134 to be depressed; and/or put pressure on the actuator region 136*a* to cause the switch 134 to be depressed, as described above. Once the actuator body 120 is released by the user's hand, the biasing member(s) (e.g. member 128 and 122) moves the actuator body 120 back towards the unactivated/unactuated position 129.

The actuator body 120 is shaped so as to provide for these different trigger regions 136*a*, 136*b*, 136*c*, either alone or in combination. For example, the trigger region 136*a* of the body 120 can start adjacent at one end (e.g. substantially flush with) to the wall 84 of the body 21 and then incline/rise to towards the raised portion/point 58 at the other end. The trigger region 136*c* of the body 120 can start adjacent at one end (e.g. substantially flush with) to the wall 84 of the body 21 and then incline/rise to towards the raised portion/point 58 at the other end. The trigger region 136*b* can be positioned at the raised portion/point 58. In this manner, the trigger portions 136*a*, 136*c* are connected to one another at the raised portion/point 58 and their outside surfaces 138 can be oriented at an obtuse angle (any angle more than 90° but less than 180°) as measured between the outside surfaces 138. The pivot point 122 can be positioned at the end 126 and the biasing member 128 at the other end 124, such that the switch 134 is configured to be activated when any of the trigger regions 136*a*, 136*b*, 136*c* are depressed.

In view of the above, manipulation of any of the trigger regions 136*a*, 136*b*, 136*c*, either alone or in combination, provides the same movement 130 of the actuator body 120 about the pivot point 122 and thus provides a same/similar tactile feel to the user each time the switch 134 is activated.

Further, the ends of the trigger regions 136*a*, 136*c* can be as shown (e.g. flush with the adjacent wall 84 of the body 21), or can be raised (e.g. at a different height) with respect to the adjacent wall 84 of the body 21 to further denote the presence of the actuator body 120 under the overmold 56, as desired.

Figure 19:
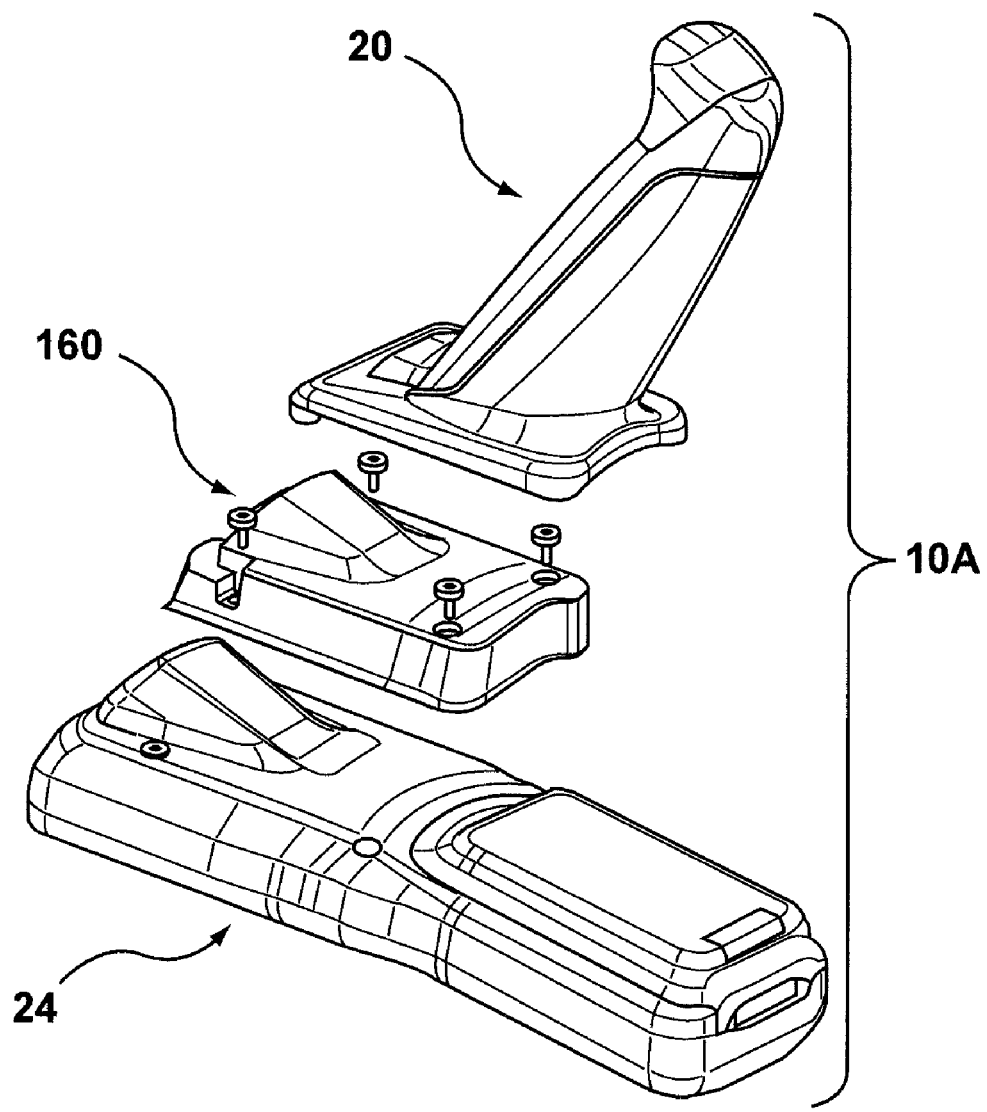
FIG. 19 is a side view of another example of the portable terminal of FIG. 9.

In the above example, the computer 24 is docked into the handle 20. However, another peripheral may be attached to the computer 24 or may be attached between the enclosure 23 of the computer 24 and the handle 20, as shown in FIG. 19. The attached peripheral may be operated from the computer 24, or the computer 24 may be operated by the peripheral.

In FIG. 19, the handheld computer 24 is coupling to an external peripheral 160, and the handle 20. The peripheral 160 is an external expansion and may have data acquisition components, communication components, memory etc. The computer 24 is coupled to the peripheral 160 via a control coupling that correspond to the control coupling 40 of FIG. 10, and also via a mechanical coupling that correspond to the mechanical coupling 38 of FIG. 10. The peripheral 160 is coupled to the handle 20 via a control coupling that corresponds to the control coupling 40 of FIG. 10, and also via a mechanical coupling that correspond to the mechanical coupling 38 of FIG. 10.

The computer 24 and the peripheral 160 communicate with each other when they are coupled to each other. The peripheral 160 and the handle 20 communicate with each other when they are coupled to each other. Thus the portable terminal 10A of FIG. 19 operates as a unit. Each of the handle 20 and the peripheral 160 is uniquely assigned "resistive values" which are detected upon connection to the computer 24.

For example, the peripheral 160 has an electrical contact that corresponds to the mating electrical contact 40*b* and is coupled to the electrical contact 40*a* of the computer 24 (see FIG. 10). The peripheral 160 also has an electrical contact that corresponds to the electrical contact 40*a* and is coupled to the electrical contact 40*b* of the handle 20 (see FIG. 10).

The control coupling for the computer 14 and the peripheral 160 includes, for example, one or more slots, mating protrusions, one or more latches and slots that correspond to the slots 38, the mating protrusions 38*b*, the slots 38*d* (see FIG. 10). The control coupling for the peripheral 160 and the handle 20 includes, for example, one or more slots, mating protrusions, one or more latches and slots that correspond to the slots 38, the mating protrusions 38*b*, the slots 38*d* (see FIG. 10).

The invention claimed is:

1. A handheld terminal comprising:
    a housing;
    a component assembly comprising:
        a display assembly including a display component operatably coupling to a main logic circuit and a display boot for encasing the display component;
    a bezel placed on at least a part of the component assembly; and
    a combiner for removable engaging the bezel with the housing,
    the housing including a pocket for forming a space for holding the display assembly and separating the space from the main logic circuit, the pocket having a window for a connection between the display component placed in the space of the pocket and the main logic circuit under the space of the pocket,
    the window being covered by the display assembly when the display assembly is placed in the space,
    the combination of the housing, the display boot and the bezel provides a seal for the handheld terminal to prevent an ingress of dust or water.

2. A handheld terminal as claimed in claim 1, wherein the housing comprises one or more threads, the bezel comprising one or more openings corresponding to the one or more threads, the combiner comprising one or more screws inserted from the openings and removably engaged with the threads.

3. A handheld terminal as claimed in claim 1, wherein the housing comprises a keyboard pocket having a space for removably holding a keyboard assembly, the keyboard pocket including a window for a connection between a keyboard flex cable coupled to the main logic circuit and the keyboard assembly, the window of the keyboard assembly being covered by the keyboard assembly when the keyboard assembly is placed in the space of the keyboard pocket.

4. A handheld terminal as claimed in claim 3, wherein the keyboard assembly comprises:
a keyboard PCB, a keyboard elastomer placed on the keyboard PCB, and a keyboard bezel placed on the keyboard elastomer.

5. A handheld terminal as claimed in claim 4, wherein the keyboard PCB comprises one of an alignment hole and an alignment pin, and wherein the keyboard pocket comprises the alignment pin or the alignment hole so that the alignment pin formed on one of the keyboard PCB and the keyboard pocket receives the alignment hole formed on the other one of the keyboard PCB and the keyboard pocket.

6. A handheld terminal as claimed in claim 3, wherein the front housing comprises one or more threads, a keyboard bezel comprising one or more openings corresponding to the one or more threads, the combiner comprising one or more screws inserted from the openings and removably engaged with the threads.

7. A handheld terminal as claimed in claim 6, wherein the main logic circuit is placed under the keyboard pocket.

8. A handheld terminal as claimed in claim 6, wherein the keyboard bezel and the front housing include complementary snap fit members for snap-fitting, and wherein the keyboard bezel is releasably engaged with the housing through the snap-fitting.

9. A handheld terminal as claimed in claim 3, comprising a board to board connector placed in the keyboard space for connecting the keyboard assembly to a docking board.

10. A handheld terminal as claimed in claim 1, wherein the window is provided for a connection between a display flex connector on the main logic circuit and a display flex cable coupled to the display assembly.

11. A handheld terminal as claimed in claim 10, wherein the housing comprises one or more threads, threaded openings, the bezel comprising one or more openings corresponding to the one or more threads, the combiner comprising one or more screws inserting from the one or more openings and removably engaged with the threaded openings.

12. A handheld terminal as claimed in claim 10, wherein the display flex cable is releasably latched on the display flex connector.

13. A handheld terminal as claimed in claim 10, wherein the main logic circuit with the display flex connector is disposed under the display pocket.

14. A handheld terminal as claimed in claim 10, wherein the display flex cable is a customized flex cable.

* * * * *

UNITED STATES PATENT AND TRADEMARK OFFICE
CERTIFICATE OF CORRECTION

PATENT NO.      : 8,199,489 B2                                    Page 1 of 1
APPLICATION NO. : 12/511414
DATED           : June 12, 2012
INVENTOR(S)     : Mangaroo et al.

It is certified that error appears in the above-identified patent and that said Letters Patent is hereby corrected as shown below:

In the Specifications

In Column 2, Line 42, delete "DRAWING" and insert -- DRAWINGS --, therefor.

In Column 2, Line 65, delete "a an" and inset -- an --, therefor.

In the Claims

In Column 13, Line 16, in Claim 4, delete "PCB," and insert -- printed circuit board (PCB), --, therefor.

Signed and Sealed this
Seventh Day of May, 2013

Teresa Stanek Rea
*Acting Director of the United States Patent and Trademark Office*